US008964325B1

United States Patent
Yamada

(10) Patent No.: US 8,964,325 B1
(45) Date of Patent: Feb. 24, 2015

(54) MAGNETIC DISK DEVICE AND METHOD FOR READ/WRITE OFFSET ERROR CORRECTION

(71) Applicant: Kabushiki Kaisha Toshiba, Minato-ku, Tokyo (JP)

(72) Inventor: Tomoyoshi Yamada, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/197,627

(22) Filed: Mar. 5, 2014

Related U.S. Application Data

(60) Provisional application No. 61/915,738, filed on Dec. 13, 2013.

(51) Int. Cl.
*G11B 5/596* (2006.01)

(52) U.S. Cl.
USPC ............................. 360/77.08; 360/75; 360/76

(58) Field of Classification Search
CPC ..................... G11B 20/10231; G11B 20/1876; G11B 5/02; G11B 5/48; G11B 5/488; G11B 5/54; G11B 5/5526
USPC ......... 360/55, 69, 75, 77.01, 78.01, 250, 260, 360/290, 58, 76, 77.08
See application file for complete search history.

(56) References Cited

U.S. PATENT DOCUMENTS

| 6,172,838 B1 * | 1/2001 | Ohba ........................ 360/77.04 |
| 6,317,285 B1 * | 11/2001 | Bi et al. ............................ 360/75 |
| 6,369,974 B1 * | 4/2002 | Asgari et al. ............... 360/78.14 |
| 6,421,197 B1 | 7/2002 | Abdelnour |
| 6,510,017 B1 * | 1/2003 | Abdelnour ................. 360/77.04 |
| 6,519,107 B1 | 2/2003 | Ehrlich et al. |
| 6,687,073 B1 | 2/2004 | Kupferman |
| 6,735,031 B2 * | 5/2004 | Chainer et al. .................. 360/51 |
| 6,765,744 B2 | 7/2004 | Gomez et al. |
| 7,006,316 B1 * | 2/2006 | Sargenti et al. ................. 360/51 |
| 7,586,709 B2 | 9/2009 | Fukushima et al. |
| 7,667,920 B2 | 2/2010 | Patwardhan et al. |
| 8,054,567 B2 * | 11/2011 | Mochizuki et al. ............. 360/31 |
| 8,462,381 B2 * | 6/2013 | Yamazaki ...................... 358/1.5 |
| 8,638,649 B1 * | 1/2014 | Hyde et al. ................. 369/53.39 |
| 2002/0101672 A1 * | 8/2002 | Chainer et al. ................. 360/51 |
| 2003/0002197 A1 * | 1/2003 | Seng et al. ..................... 360/76 |
| 2003/0026036 A1 * | 2/2003 | Chew ......................... 360/77.08 |
| 2006/0056093 A1 * | 3/2006 | Ehrlich et al. .................. 360/75 |
| 2007/0230016 A1 * | 10/2007 | Nakamura ...................... 360/75 |
| 2008/0239557 A1 | 10/2008 | Gerasimov |
| 2012/0002314 A1 | 1/2012 | Huang et al. |
| 2013/0033778 A1 | 2/2013 | Nishiyama et al. |

FOREIGN PATENT DOCUMENTS

| JP | 2000-322848 | 11/2000 |
| JP | 2007-272970 | 10/2007 |
| JP | 2008-257839 | 10/2008 |
| JP | 2013-033584 | 2/2013 |

* cited by examiner

*Primary Examiner* — Thomas Alunkal

(74) *Attorney, Agent, or Firm* — Knobbe, Martens, Olson & Bear, LLP

(57) ABSTRACT

A magnetic disk device according to an embodiment includes a head and a disk with a recording surface, the head including a reader configured to perform data reading, and a writer configured to write data. A method of correcting a read/write offset, according to the embodiment, is applied to the above magnetic disk device. This method includes reconstructing position data read by the reader, using a spline function, and correcting a read/write offset due to the distance between the writer and the reader, using the reconstructed position data.

8 Claims, 18 Drawing Sheets

| e | Position error (PE) |
| e' | Position error signal (PES) |
| ref | Target track, offset |
| r | Target track displacement (vibration) | p:=OP
h:=PH
r:=OH
g:=HH₁
(R-W distance)

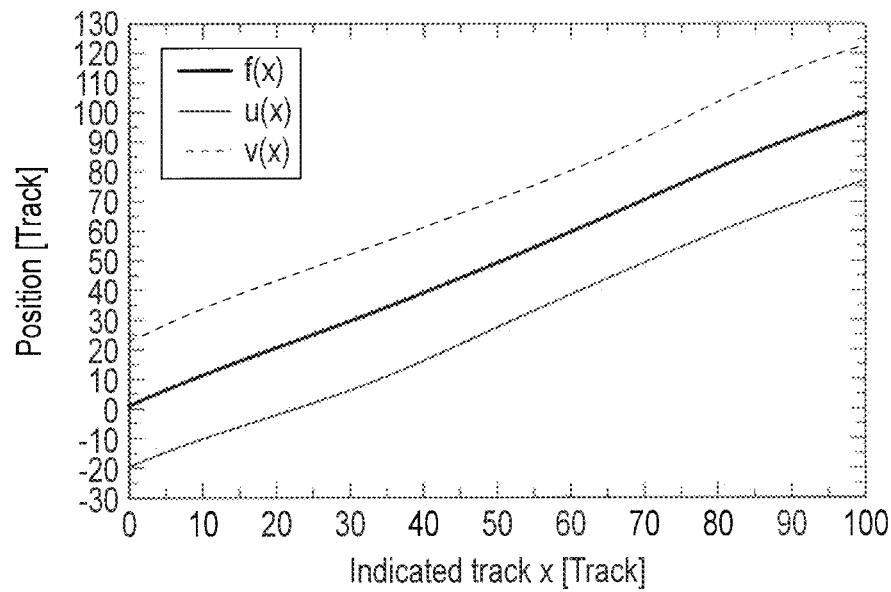
F I G. 7
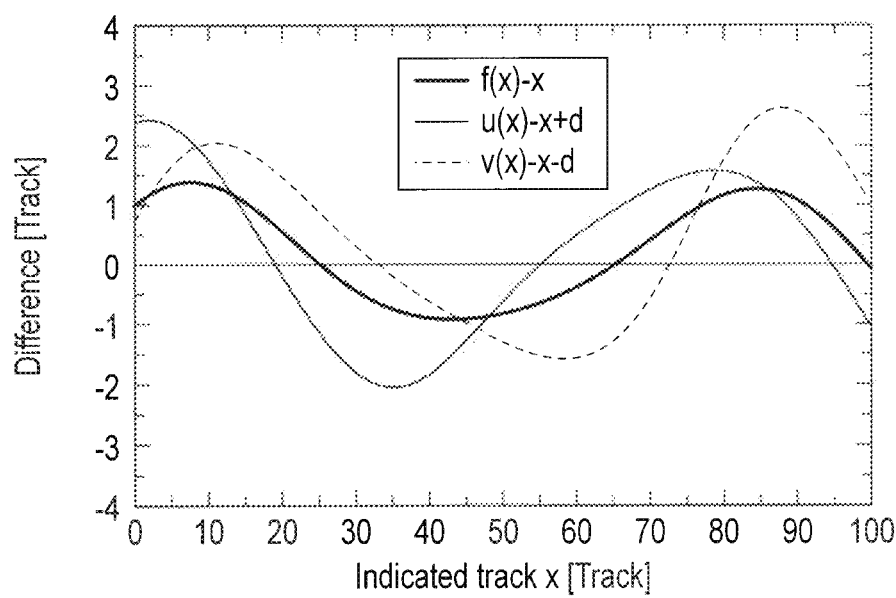
F I G. 8

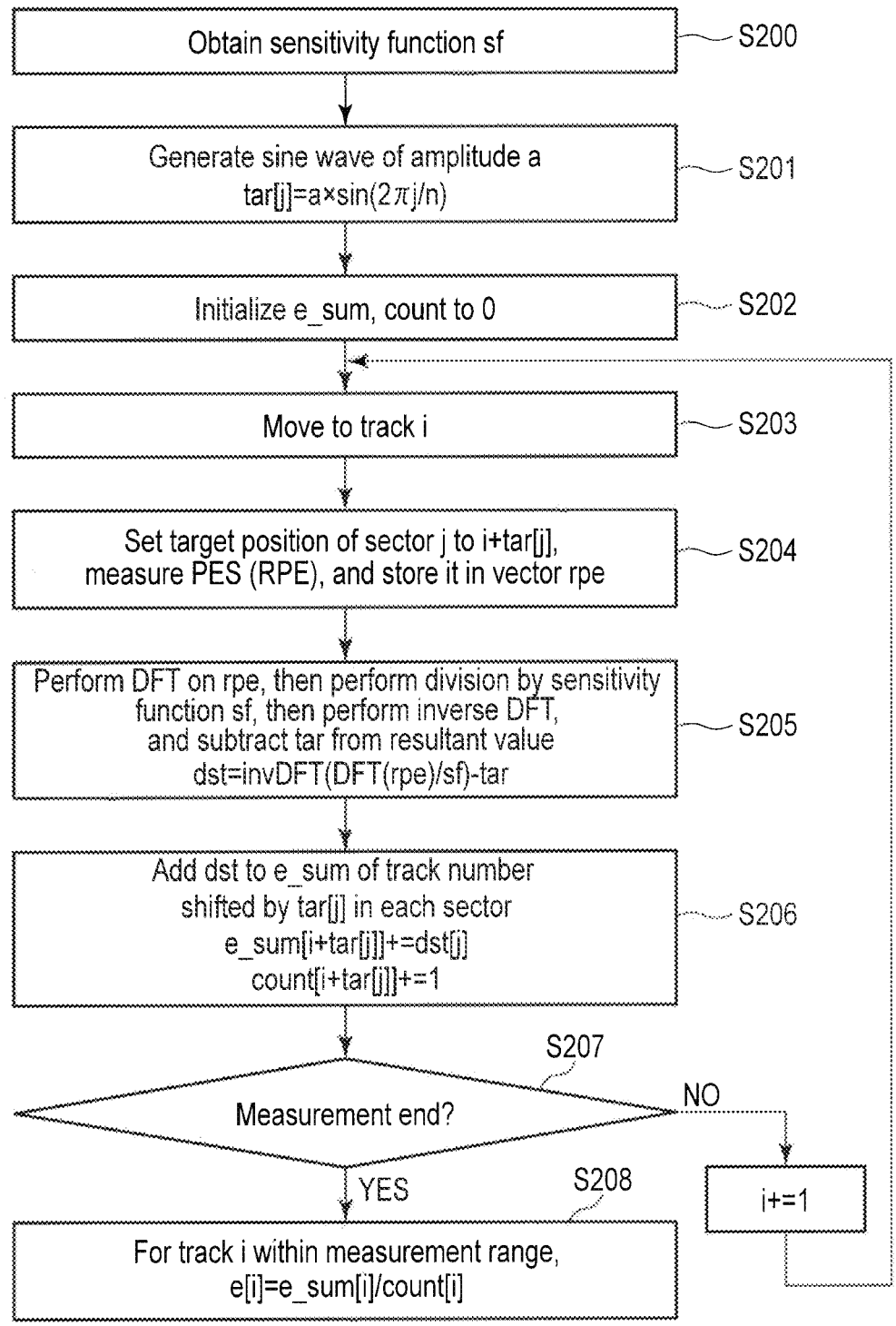
F I G. 15

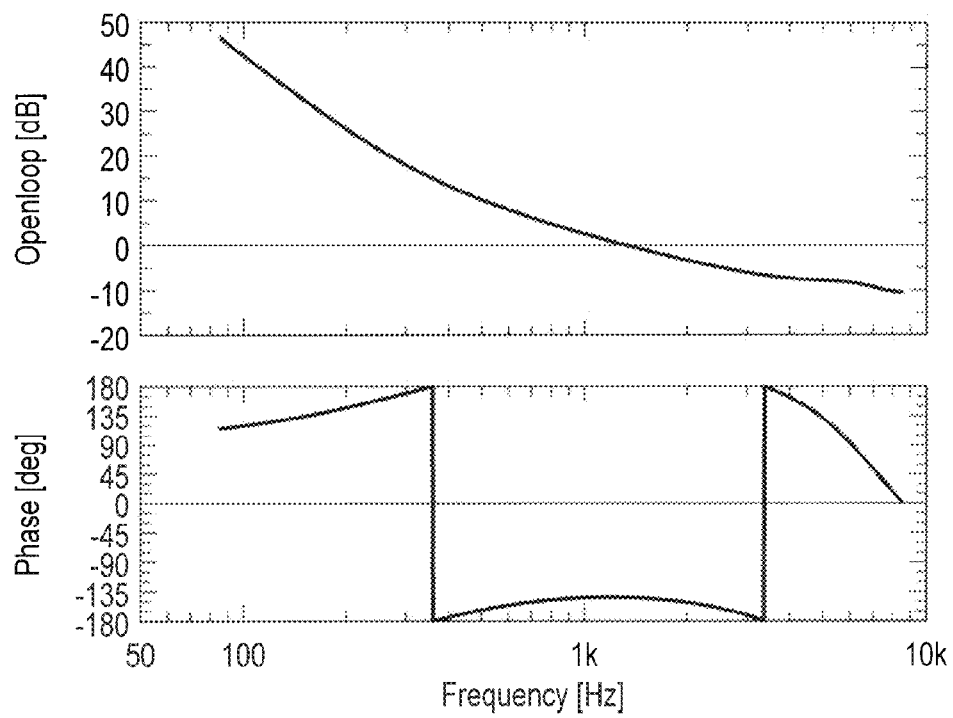
F I G. 16
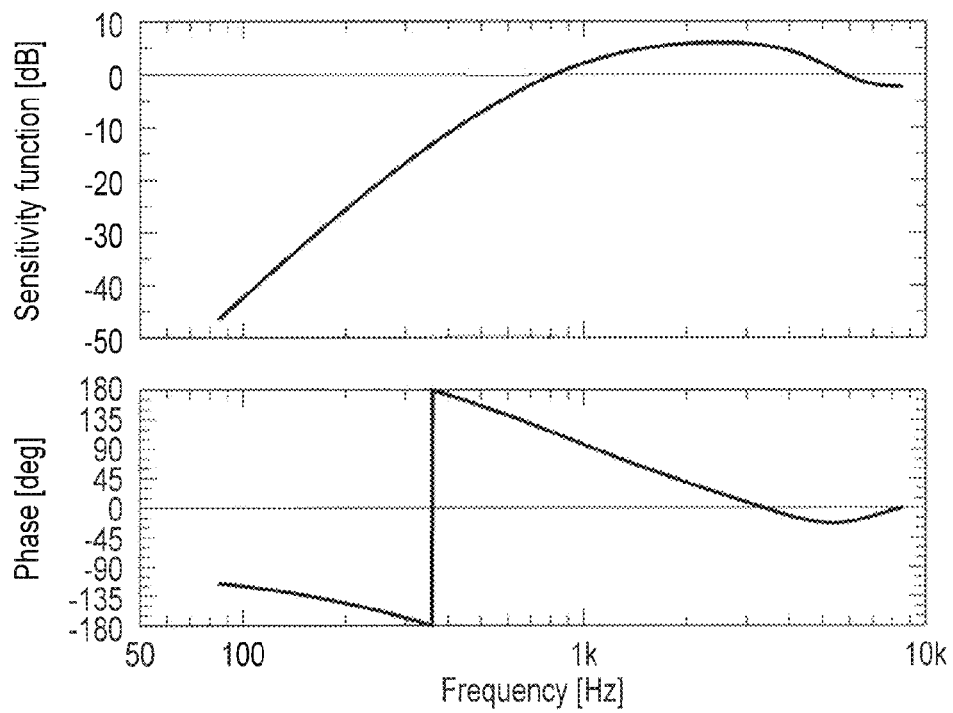
F I G. 17

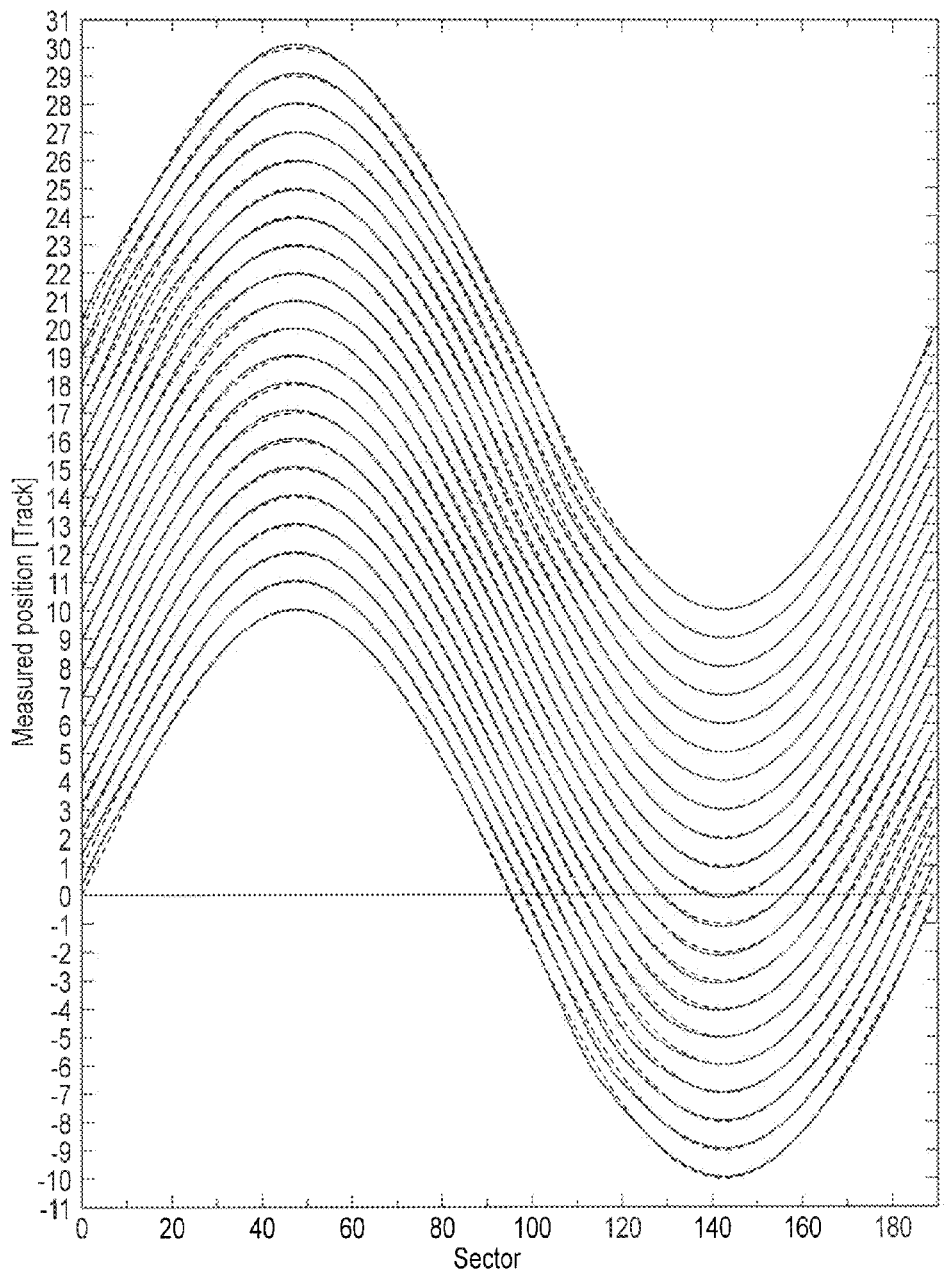
F I G. 18

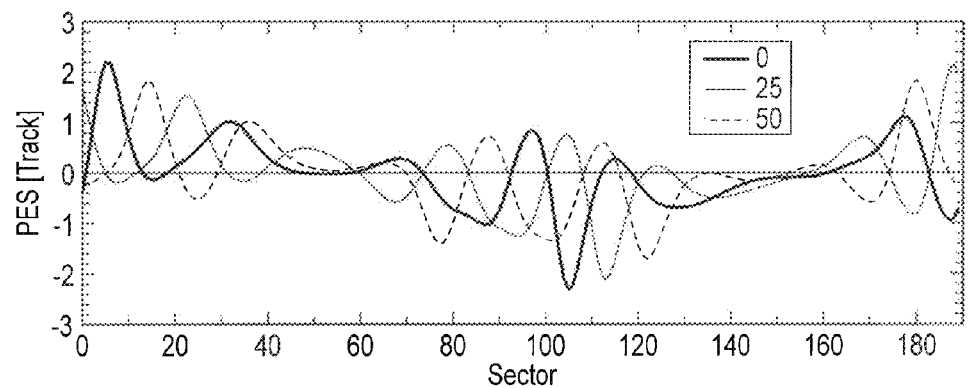
F I G. 20
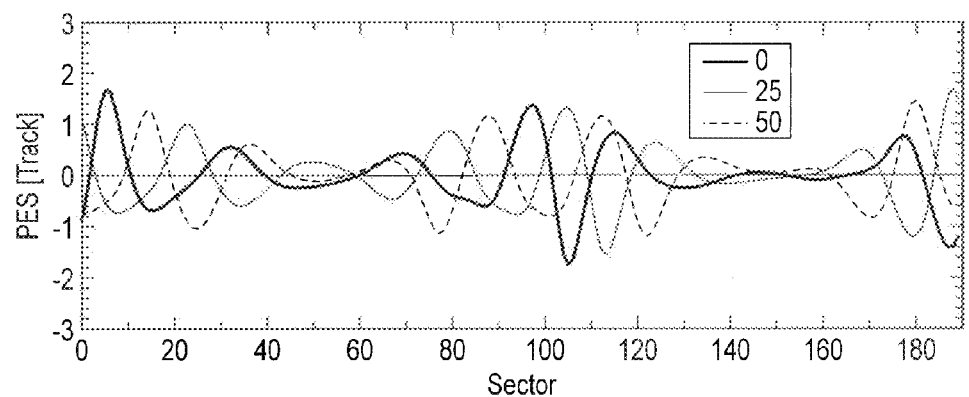
F I G. 21
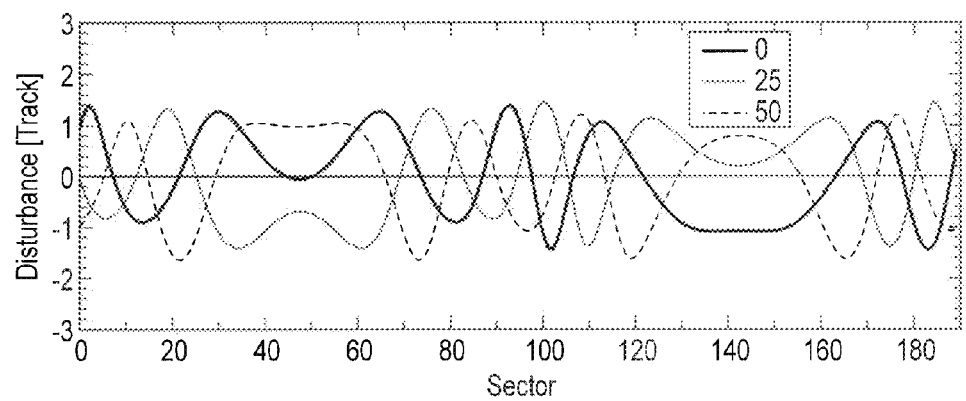
F I G. 22

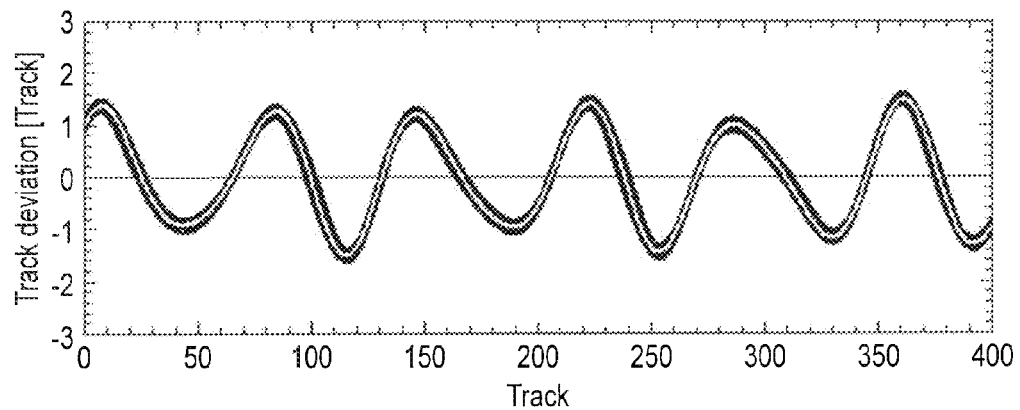
F I G. 26
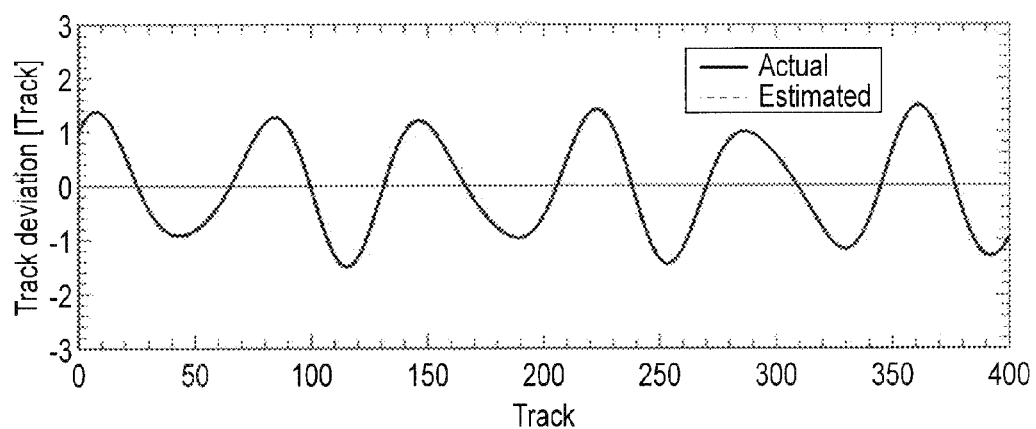
F I G. 27

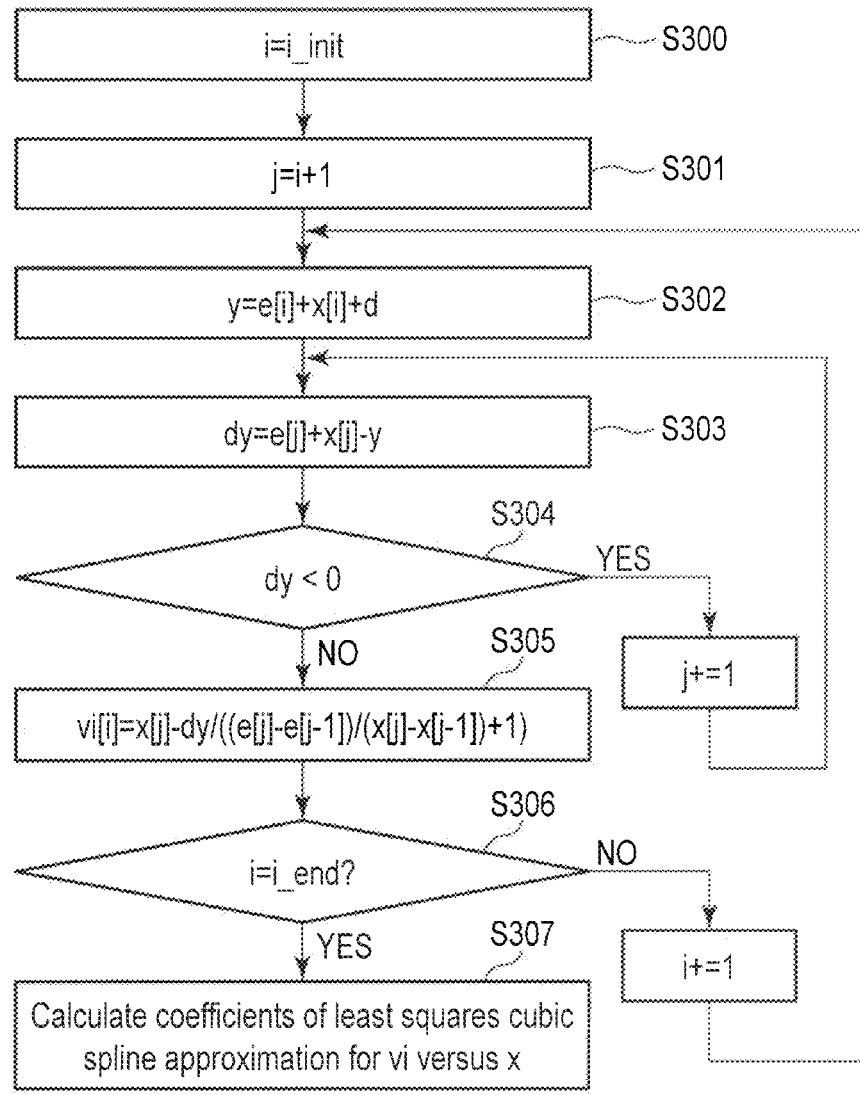
F I G. 28

MAGNETIC DISK DEVICE AND METHOD FOR READ/WRITE OFFSET ERROR CORRECTION

CROSS-REFERENCE TO RELATED APPLICATIONS

This application claims the benefit of U.S. Provisional Application No. 61/915,738, filed Dec. 13, 2013, the entire contents of which are incorporated herein by reference.

FIELD

Embodiments generally relate to a magnetic disk device, and a method for read/write offset error correction.

BACKGROUND

In conventional magnetic disk devices, such as hard disk drives (HDDs), a head is positioned on a target track to execute writing and reading by reading servo information magnetically recorded on a disk and demodulating the information. The head comprises a write head element (writer) for recording data on the disk, and a read head element (reader) for reading data from the disk. The writer and the reader are arranged with a nominal space therebetween. Accordingly, when the data written by the writer is read by the reader, the reader is offset in a cross-track direction. The amount of offset is called a read/write (R/W) offset. R/W offsets differ from each other between individual heads. Further, when, for example, a swing actuator is employed in the magnetic disk device, the R/W offset assumes different values when the head is positioned in different radial positions on the magnetic disk. Based on the different R/W offset values, R/W offset correction is performed.

There are some methods for obtaining R/W offset values. Among these methods, there is a method of obtaining R/W offset values, based on measurement values (associated with, for example, data quality) assumed in each radial position. In this method, a R/W offset is measured for each of plural tracks.

However, to correct a track error (track deviation) due to an infralow frequency component, it is necessary to measure the R/W offset with a short pitch in the cross-track direction. Therefore, measurements for the correction of the track deviation due to the infralow frequency component require an enormous processing time.

BRIEF DESCRIPTION OF THE DRAWINGS

FIG. 7 is a graph showing a relationship example between f(x), u(x) and v(x);

FIG. 8 is an enlarged view showing only track deviation components in FIG. 7;

FIG. 13 shows an example of a R/W pattern of a servo pattern written to a data sector, according to an embodiment;

FIG. 14 shows another example of a R/W pattern of a servo pattern written to the data sector, according to the embodiment;

FIG. 15 is a flowchart showing an estimation procedure of a track deviation;

FIG. 16 shows an example of an open-loop transfer function;

FIG. 17 shows an example of a sensitivity function;

FIG. 18 is a graph showing examples of following target paths and head paths expressed by the track coordinate;

FIG. 20 is a graph showing rpe values in a track-0, a track-25 and a track-50;

FIG. 21 is a graph showing PES components due to track deviation;

FIG. 22 is a graph showing result obtained by filtering the PES components in FIG. 20 using an inverse sensitivity function and eliminating a sine-wave target path therefrom;

FIG. 26 is a graph showing result obtained by superposing the errors from target points, which have occurred when the head was attempted to be offset to the target points;

FIG. 27 is a graph showing the comparison result of e(x) values and estimated values;

FIG. 28 is a flowchart of a procedure of calculating correction amount interpolation values vi from e(x) values to thereby obtain coefficients of a spline function;

DETAILED DESCRIPTION

A magnetic disk device according to an embodiment includes a head and a disk with a recording surface, the head including a reader configured to perform data reading, and a writer configured to write data. A method of correcting a read/write offset, according to the embodiment, is applied to the above magnetic disk device. This method includes reconstructing position data read by the reader, using a spline function, and correcting a read/write offset due to the distance between the writer and the reader, using the reconstructed position data.

Although some embodiments will now be described, the invention is not limited to them.

The embodiments will be described with reference to the accompanying drawings.

(Structure of Magnetic Disk Device)

Figure 1:
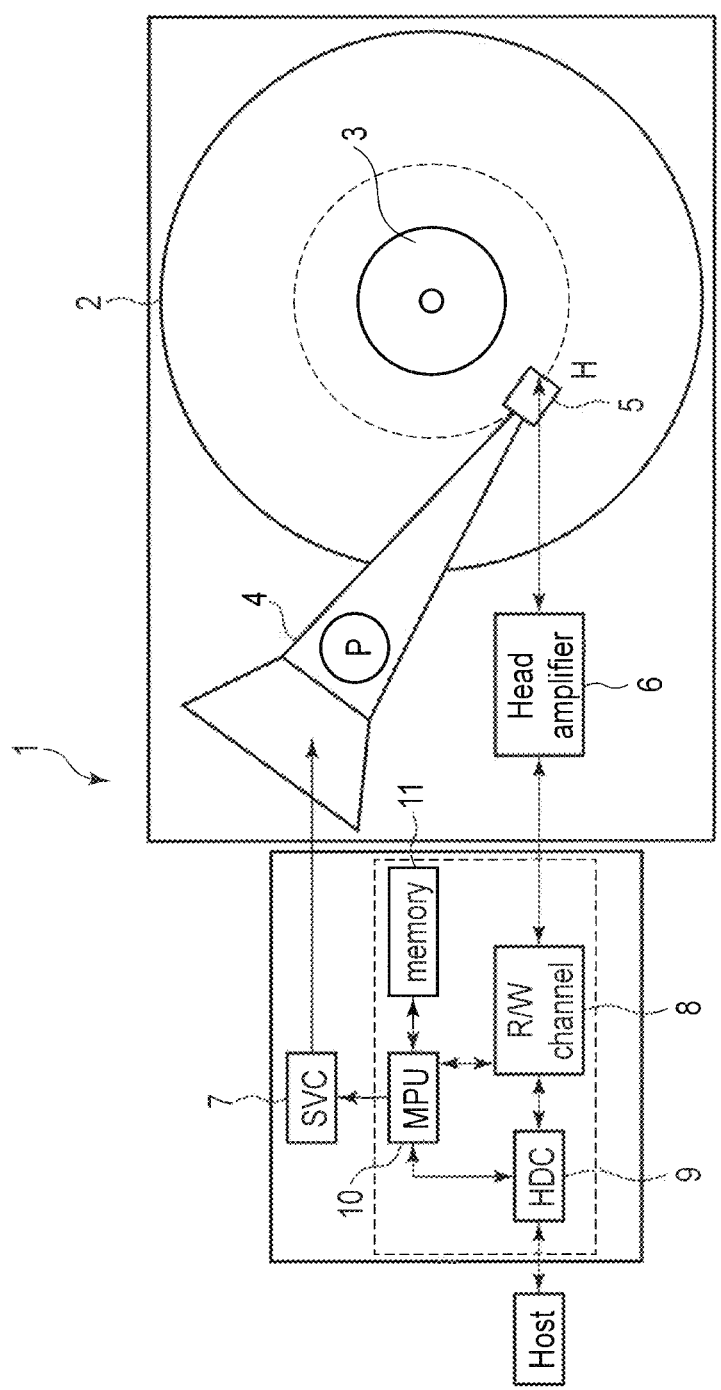
FIG. 1 is a schematic view showing an example of an HDD.

FIG. 1 is a schematic view showing an example of an HDD. Firstly, a description will be given of an example of the structure of a magnetic disk device 1, such as an HDD. In FIG. 1, the magnetic disk device 1 comprises a plurality of magnetic disks 2, a spindle motor (SPM) 3, an actuator 4 including a voice coil motor (VCM), a plurality of heads 5 and a head amplifier 6, which are contained in a case.

The magnetic disk device 1 also comprises a servo combo (SVC) 7, a read/write (R/W) channel 8, a hard disk controller (HDC) 9, a microprocessor unit (MPU) 10 and a nonvolatile memory 11, which are mounted on a control board.

Each magnetic disk 2 is secured to the SPM 3 to rotate. Servo information is written on the recording surface of each magnetic disk 2. The actuator 4 including the VCM, on which the heads 5 are mounted, is driven by the SVC 7 and the MPU 10. More specifically, the actuator 4 is powered by the current output from the SVC 7. The actuator 4 causes each head 5 to move radially with respect to the corresponding magnetic disk 2. In accordance with the rotary motion, each head 5 is moved to the position opposing the recording surface of the corresponding magnetic disk 2. The head amplifier 6 is connected to the heads 5 to supply a R/W signal to them.

The R/W channel 8 processes a read signal sent from the head amplifier 6 to read servo information from the signal. Further, the R/W channel 8 processes servo information to write a servo pattern, converts the servo information into a write signal, and sends the write signal to the head amplifier 6. Furthermore, the R/W channel 8 converts the user data transferred from the HDC 9 into a write signal, and sends this write signal to the head amplifier 6. The HDC 9 is an interface for the magnetic disk device 1 and a host. The HDC 9 controls transfer of user data between the magnetic disk device 1 and the host.

The MPU 10 controls the driving mechanism of the actuator 4, based on the servo information sent from the head amplifier 6 to position the head 5 (target head) to a target track. The nonvolatile memory 11 stores control programs, read/write parameters, etc.

Figure 2:
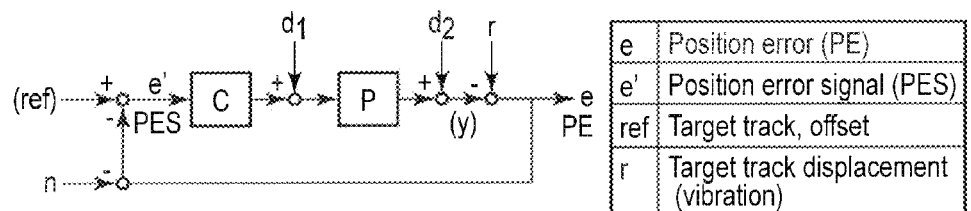
FIG. 2 is a block diagram showing an example of a servo loop for positioning control system of the HDD.

FIG. 2 is a block diagram showing an example of a servo loop for an HDD positioning control system. In FIG. 2, when the head 5 is moved to the target track or an offset is made, a position error signal (PES) is input to the MPU 10 as a control system. By a control current supplied from the SVC 7 based on the control signal processed by the MPU 10, the actuator 4 as a control target is driven.

Figure 3:
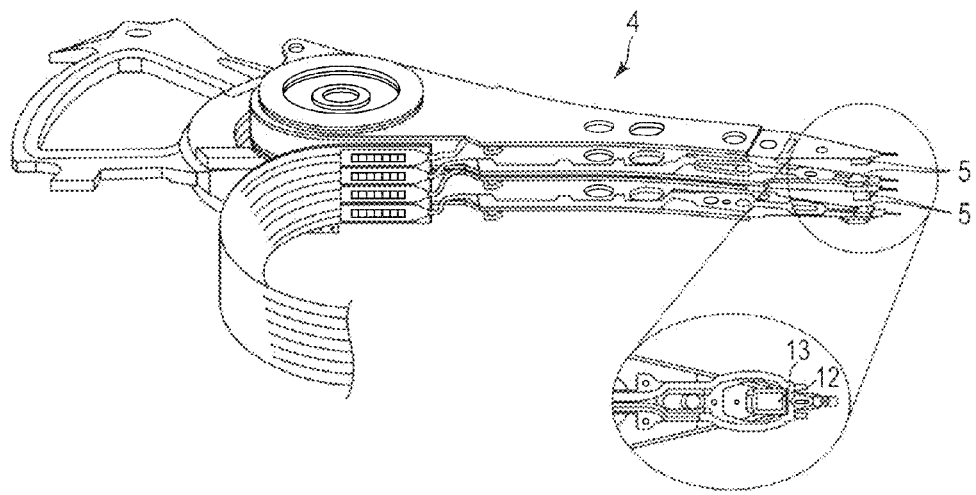
FIG. 3 is a view showing an example of a head mounted on an actuator.

FIG. 3 is a view showing an example of each head 5 mounted on the actuator 4. Each head 5 comprises a write head element (writer) 12 configured to write (record) information to the magnetic disk 2, and a read head element (reader) 13 configured to read (reproduce) information from the magnetic disk 2. The writer 12 and the reader 13 are arranged with a nominal distance (predetermined design value) therebetween. For facilitating the description, the distance between the writer 12 and the reader 13 has been expressed as "nominal distance." Actually, however, there exist great variations in the distance between the writer 12 and the reader 13 among individual heads. Accordingly, when the writer 12 performs writing, the reader 13 is positioned in a target position, based on a servo pattern.

Figure 4:
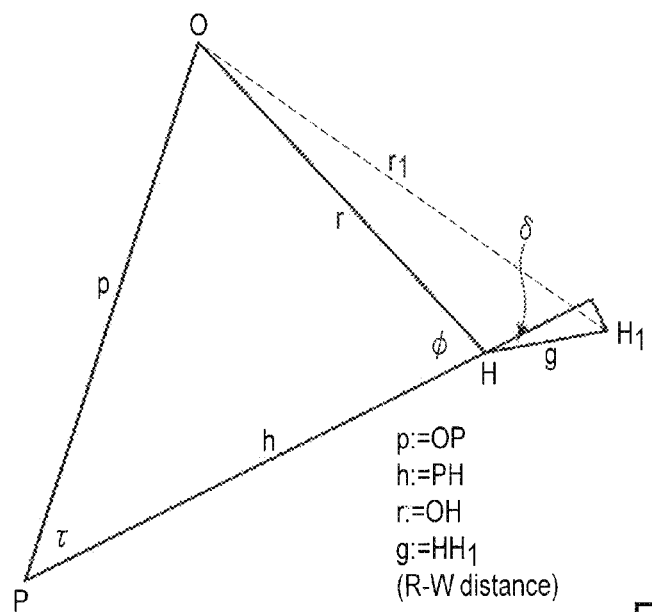
FIG. 4 is a view showing a geometric positional relationship associated with a R/W offset.

FIG. 4 is a view showing a geometric positional relationship associated with a R/W offset. In FIG. 4, the position of the writer 12 is denoted by H1, and the position of the reader 13 is denoted by H. The symbol O denotes the rotation center O of the spindle 3, and symbol P denotes the rotation center P of the actuator 4.

Further, the distances between the respective positions are denoted by p=OP, h=PH, r=OH, r1=OH1 and g=HH1. The angle between the line segments OH and PH is denoted by $\phi$. Similarly, the angle between the line segments PH and HH1 is denoted by $\delta$. For facilitating the description, the R/W offset may be referred to as "d."

In the description below, for facilitating the description, the direction from the inside (ID) to the outside (OD) on the magnetic disk 2 is defined as a positive direction. Accordingly, if r1>r, the R/W offset is positive (d>0). Further, if the head moves in a direction in which r1 is increased, $\delta$ is positive ($\delta$>0).

Furthermore, if a perpendicular line is dropped from the point H1 to the line segment PH, a horizontal component ga is expressed as ga=g cos $\delta$, and a vertical component gb is expressed as gb=g sin $\delta$. From the above-described positional relationship, the distance of, for example, the R/W offset can be geometrically determined using, for example, the law of cosines (the cosine formula). At this time, d=r1−r.

Figure 5:
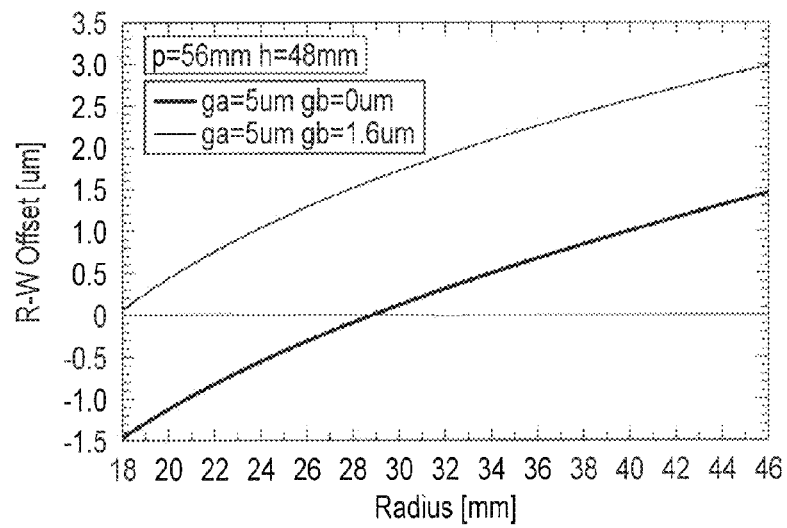
FIG. 5 is a graph showing examples of R/W offsets from ID to OD of a magnetic disk.

FIG. 5 is a graph showing examples of R/W offset values from ID to OD of the magnetic disk. In FIG. 5, the thick line indicates the R/W offset values from ID to OD of the magnetic disk 2 assumed when p=56 mm, h=48 mm, ga=5 μm and gb=0. The thin line indicates the R/W offset values from ID to OD of the magnetic disk 2 assumed when p=56 mm, h=48 mm, ga=5 μm and gb=+1.6 μm. That is, when a head having a predetermined offset as indicated by the thin line of FIG. 5 has been used, the R/W offset "d" is higher than 0 in the overall region from ID to OD.

(Principle of R/W Offset Measuring Method)

The two methods described below are examples of general R/W offset measuring methods.

In one method, firstly, data is written to an arbitrary track, then offset, and read by a reader. Subsequently, the quality of the demodulated data is estimated by track average amplitude (TAA), bit error rate, or Viterbi metric margin (VMM). After that, the offset that makes the estimated quality of the data highest is measured. This offset is regarded as the R/W offset.

In the other method, offsets are measured from the opposite sides of a track to detect right-hand left-hand offsets that provide preset data quality (BER or VMM). After that, the intermediate point of the right-hand and left-hand offsets is measured. This intermediate offset is set as the R/W offset.

In both of the above methods, since data quality is measured by iterating offset operations, a lot of time is required, which makes it difficult to determine R/W offsets for all tracks. In view of this, the R/W offset is measured per, for example, several hundreds tracks, and R/W offsets obtained by interpolation are used for the tracks other than the offset measured tracks. If the R/W offset is determined from the geometric positional relationship with respect to the radial position, satisfactory results can be obtained by this interpolation method.

However, the linearity of a servo track with respect to the cross-track position is incomplete, and varies in short cycles. The "cycle" means a spatial cycle. The deviation, in a short cycle, of the head on a servo track from the line of a cross-track direction is called a track error(track deviation).

For instance, on the servo track of a bank head during a self servo track write (self STW) of a bank write scheme, such a track deviation may become conspicuous. In the self STW of the bank write scheme, a master head writes data to a servo track with the head fixed in position, and hence the track deviation on a master head surface is small. In contrast, the bank head is not self positioned. The term "bank head(slave heads)" means heads except the master head.

Accordingly, during the self STW of the bank write scheme, a deviation will occur in the servo track on a bank head surface because of a relative displacement of the master head and the bank head, or because of a relative displacement of the master head surface and the bank head surface.

The relative displacements may well be caused by infralow frequency components associated with, for example, elastic deformation or thermal deformation (thermal expansion) of the assembly due to air flow, or with the inclination of the spindle or of the bearing assembly of the actuator pivot. The infralow frequency means a much lower frequency than the frequency of oscillation disturbance that is regarded, in general, as a problem in HDD positioning control. These infralow frequency components are hardly observed in the position error signal (PES), but occur as a data demodulation error due to shortage of offset margin during reading. As a result, the sector where the infralow frequency components are conspicuous is registered as a defective sector, thereby causing device capacity shortage. Even the sector where the infralow frequency components are not conspicuous may cause rash of re-reading due to offset, resulting in a deterioration in the performance of the HDD as a magnetic disk device.

In contrast, variation in pitch between adjacent tracks can be ignored because the infralow frequency components are very smaller than the pitch. Since in this case, write to write track mis-registration (W-W TMR), i.e., track squeeze, little occurs, errors will not occur if reading is performed with offsets appropriately corrected. However, the infralow frequency components little appear in, for example, a repeatable position error (RPE), and hence cannot easily be detected in measurements other than offset measurements. Therefore, to correct such infralow frequency components, it is necessary to execute the above-mentioned time-consuming offset measurements at short intervals in the cross-track direction.

The method, employed in the first embodiment, of measuring correction values for R/W offsets corresponds to a method of measuring R/W offsets due to the above-mentioned infralow frequency components.

Figure 6:
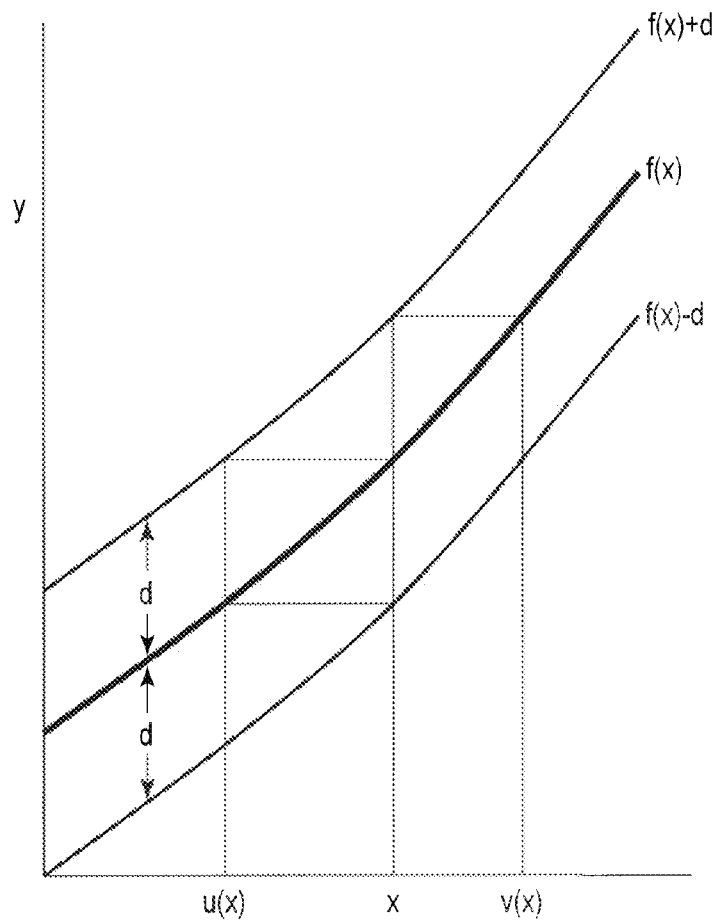
FIG. 6 is a schematic view showing relationship between the defined coordinates and physical coordinates of a servo pattern.

Referring now to FIGS. 6 to 10, a description will be given of the principle of a method for measuring a R/W offset correction value, according to the first embodiment. For the description, the symbols used herein will be defined as follows. FIG. 6 is a schematic graph showing the relationship between the defined coordinates and physical coordinates of a servo pattern. In FIG. 6, the horizontal axis indicates the defined coordinate x of the servo pattern, and the vertical axis indicates the physical coordinate y.

x is the defined coordinate (logical coordinate, track coordinate) of the servo pattern.

y is the physical coordinate (absolute coordinate).

d is the physical distance in the cross-track direction between R-W elements (R/W offset).

In the following description, the unit of each of x, y and d is set, for convenience, as a nominal STW track. Accordingly, the track shown as the unit in the figure is a STW track. In the STW track, the distance (forwarding pitch), by which the head 5 is moved in the cross-track direction to write subsequent servo information after writing servo information corresponding to one track for STW, is set as one unit.

As shown in FIG. 5, d is regarded as a constant in a relatively narrow area as in the first embodiment, although it varies depending upon the radial position of the head and is therefore a function of x or y.

$f(x)$, $u(x)$ and $v(x)$ are defined as follows:

$f(x)$ indicates the absolute coordinate of the track coordinate=x.

$u(x)$ indicates the demodulation value (track coordinate) assumed if the reader 13 could demodulate a signal of the track written in the past while the writer 12 is writing to the track coordinate x during the servo track write (STW). The term "past" means "the elapsed time corresponding to STW forwarding that corresponds to R/W offset."

$v(x)$ indicates the track coordinate in which the reader 13 is to be positioned in order to read the data written in the track x. The data written in the track x means the data written by the writer 12 when the reader 13 has been positioned in the track coordinate=x.

As shown in FIG. 6, $f(x)$ indicates the physical path of the servo track defined by the servo information in the track x. Accordingly, when the writer 12 writes data in the track x, the absolute position of the reader 13 is expressed as $y=f(x)$. Further, the absolute position of the writer 12 is expressed as $y=f(x)+d$.

When the reader 13 reads user data from the user track corresponding to the track x, if the position of the reader 13 is $f(x+d)$, the offset error is expressed by $f(x+d)-(f(x)+d)$. The offset error is the difference between $f(x+d)$ indicating the actual R/W offset, and $(f(x)+d)$ indicating the R/W offset defined by the geometric relationship shown in FIGS. 4 and 5. The offset error will occur due to, for example, fluctuation during STW.

If there is no track deviation in the cross-track direction of the servo track, the path of the servo track is expressed by $f(x)=x$. At this time, since the absolute position is expressed by $y=x$, the offset error is 0 (zero). In contrast, when there is a track deviation, the reader must be positioned in $v(x)$ that satisfies $f(v)=f(x)+d$, in order to be positioned in $f(x)+d$. If the inverse function of $y=f(x)$ can be obtained, and if it is expressed as $x=inv\_f(y)$, $v(x)=inv\_f(f(x)+d)$ and $v(x)$ are obtained. However, to actually calculate $v(x)$, it is necessary to obtain $u(x)$ as a continuous function, although $u(x)$ can be obtained only at discrete positions during the servo track write (STW). Therefore, it is necessary to obtain continuous $u(x)$ by interpolation.

In FIG. 6, when. STW is performed in the track x, the absolute position of the writer 12 is $f(x)$. At this time, the absolute position of the reader 13 is $f(x)-d$. If the demodulation value assumed when the reader 13 demodulates the servo pattern in this absolute position is $u(x)$, the absolute position of the reader 13 is analytically expressed by $f(u(x))=f(x)-d$. However, since $f(x)$ cannot be obtained analytically, its inverse function $inv\_f(x)$ cannot also be obtained.

In view of this, assuming that the inverse function of $u(x)$ is $x=inv\_u(u)$, the above-mentioned $f(u(x))$ is expressed by $f(u(x))=f(inv\_u(u))-d$. Since u, v and x all belong to the same dimension in the track coordinate (logical coordinate), u included in $f(u(x))=f(inv\_u(u))-d$ is replaced with x. By this replacement, $f(x)=f(inv\_u(x))-d$ is obtained. By comparing $f(x)=f(inv\_u(x))-d$ with $f(v)=f(x)+d$, $v(x)=inv\_u(x)$ can be derived.

As described above, if $u(x)$ can be measured during STW, $v(x)$ assumed when data is being read can be analytically derived from the analytical expression. However, it is difficult to directly determine $inv\_u(x)$. Therefore, as mentioned above, to obtain $inv\_u(x)$, $u(x)$ is obtained in some sectors between certain tracks, and demodulation values between the obtained u(x) values are interpolated to obtain a continuous function (a curved line). More specifically, inv_u(x) is obtained from the correspondence relationship between u(x) and x by interpolating demodulation values between discrete u(x) values by an approximate interpolation method utilizing an interpolation approximation function such as a spline function. The approximate interpolation method is least squares (cubic) spline approximation, smoothing spline, etc., as general approximate interpolation methods. Assume that the embodiment employs least squares (cubic) spline approximation.

By obtaining continuous inv_u(x) from discrete u(x) using least squares (cubic) spline approximation, v(x) is obtained from v(x)=inv_u(x). Further, since a correction value for the R/W offset is expressed by v(x)−x, the correction value for the R/W offset is obtained from the equation v(x)=inv_u(x). Further, since in general, spline curves indicate cubic spline curves, least squares cubic spline will be referred to simply as least squares spline.

FIG. 7 is a graph showing a relationship example between f(x), u(x) and v(x). In FIG. 7, the horizontal axis indicates the track x, and the vertical axis indicates the track position.

In FIGS. 6 and 7, the positions f(x) on an already written servo track in the cross-track direction are not completely placed on the straight line of the cross-track direction, as described above. In this case, the track interval (track pitch) in the cross-track direction is not constant.

FIG. 8 is a view obtained by enlarging only track deviation components in FIG. 7. In FIG. 8, d=22 [tracks]. In FIG. 8, f(x)−x, u(x)−x+d and v(x)−x−d are plotted.

In the servo track shown in FIGS. 7 and 8, a track deviation obtained by combining a sine wave with a cycle of 70 tracks and a sine wave with a cycle of 45 tracks is supposed.

Figure 9:
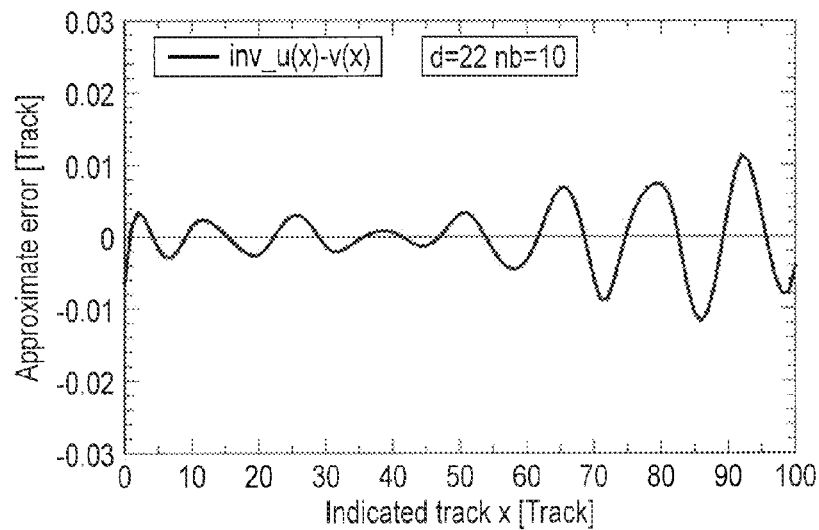
FIG. 9 is a graph showing the error between the spline approximation of the inverse function of u(x) and v(x)

FIG. 9 is a graph showing the error between the spline approximation of the inverse function of u(x) and v(x). In FIG. 9, coefficients are calculated by least squares spline approximation, using the measured u(x) values shown in FIG. As a result, as shown in FIG. 9, the errors between the inv_u(x) values reconstructed using the thus-obtained coefficients, and the v(x) values shown in FIG. 7 fall within a small range. Namely, the inv_u(x) values are substantially the same as the v(x) values of FIG. 7. As is evident from FIG. 9 that the approximate errors are not higher than 0.014 and hence can be almost ignored. Least squares spline approximation is applied to the respective data items corresponding to each tracks (cross tracks). In least squares spline approximation, the data measured within a block range is reconstructed using a cubic spline curve that is obtained by approximation made to minimize the error residual using the least squares cubic spline approximation. In the example of FIG. 9, data reconstruction has been performed for each of the 10 blocks into which data in 100 tracks is equally divided. Namely, one block contains u(x) data in 10 tracks.

Figure 10:
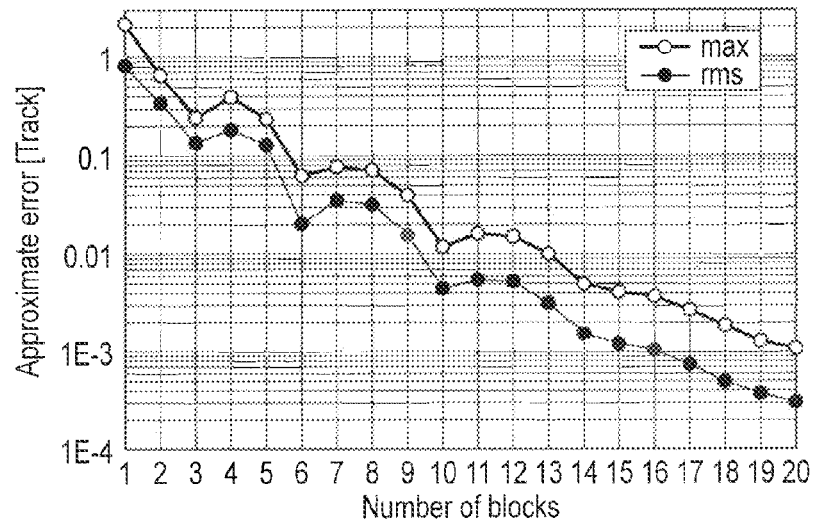
FIG. 10 is a graph showing the approximation error corresponding to the number of blocks into which 100 tracks are divided.

FIG. 10 is a graph showing the approximation errors to the number of blocks into which 100 tracks are divided. The maximum approximate error and the rms value, which are obtained when the number of blocks associated with the data in the above-mentioned 100 tracks is changed, are plotted in FIG. 10. As shown, the smaller the number of blocks, the greater the approximate error. Since approximation is performed using the cubic spline curve, the number of coefficients necessary for approximate interpolation is four per one block. Accordingly, if the number of blocks is increased, the number of the storage areas for storing the approximate interpolation coefficients is increased. The appropriate number of blocks depends upon the fluctuation cycle of the track deviation or the value of d. For instance, if the approximation error is not higher than 0.05, the error can be regarded as sufficiently small. Therefore, in this case, as shown in FIG. 10, to set the approximation error to 0.05 or less, it is necessary to divide, into 6 or more blocks, the data in 100 tracks.

(Method of Obtaining Offset Correction Value During STW)

Figure 12:
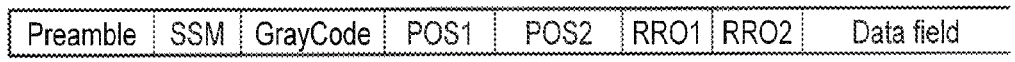
FIG. 12 shows a general servo sector.
Figure 11:
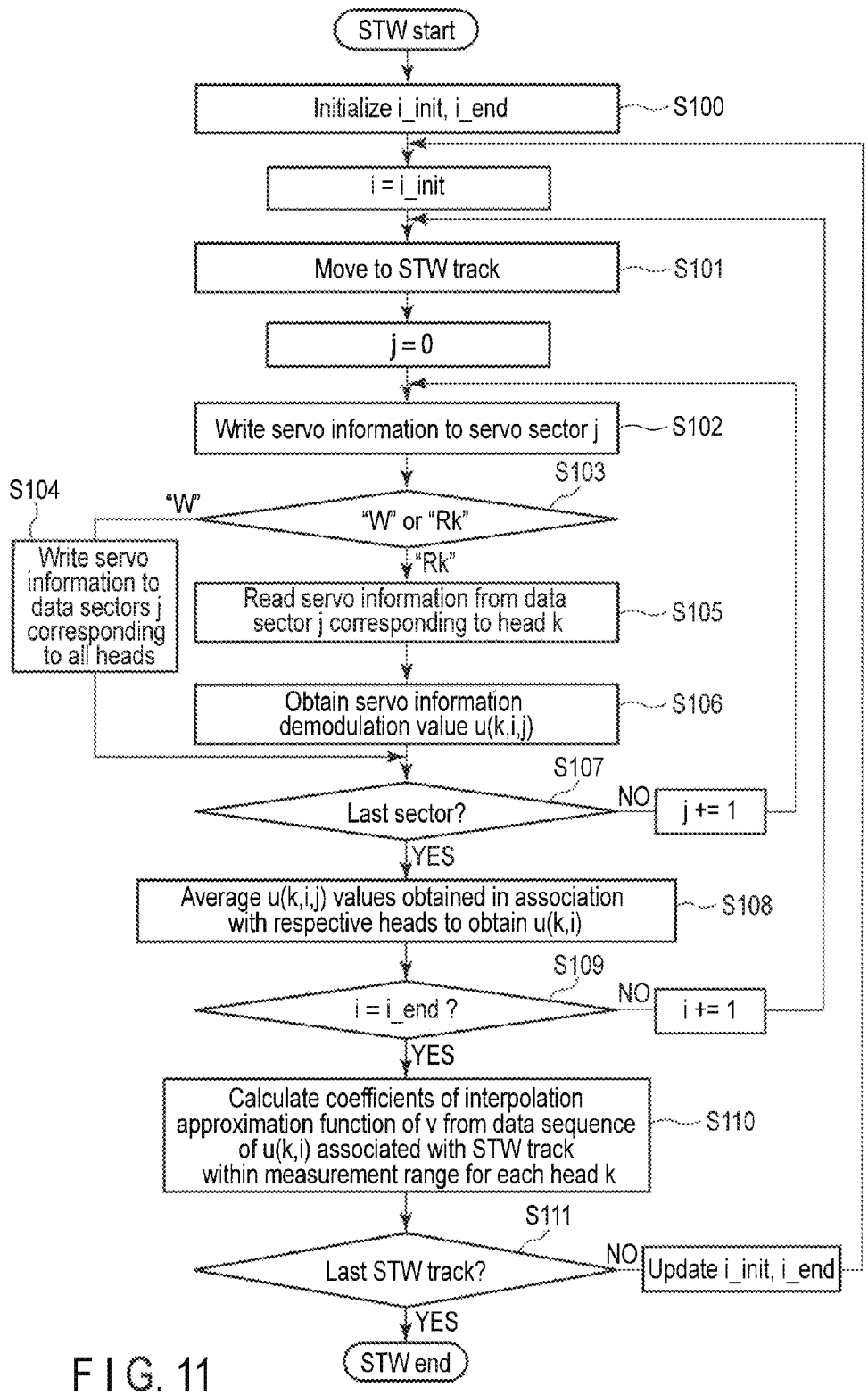
FIG. 11 is a flowchart showing a method of obtaining an offset correction value during STW.
Figure 13:
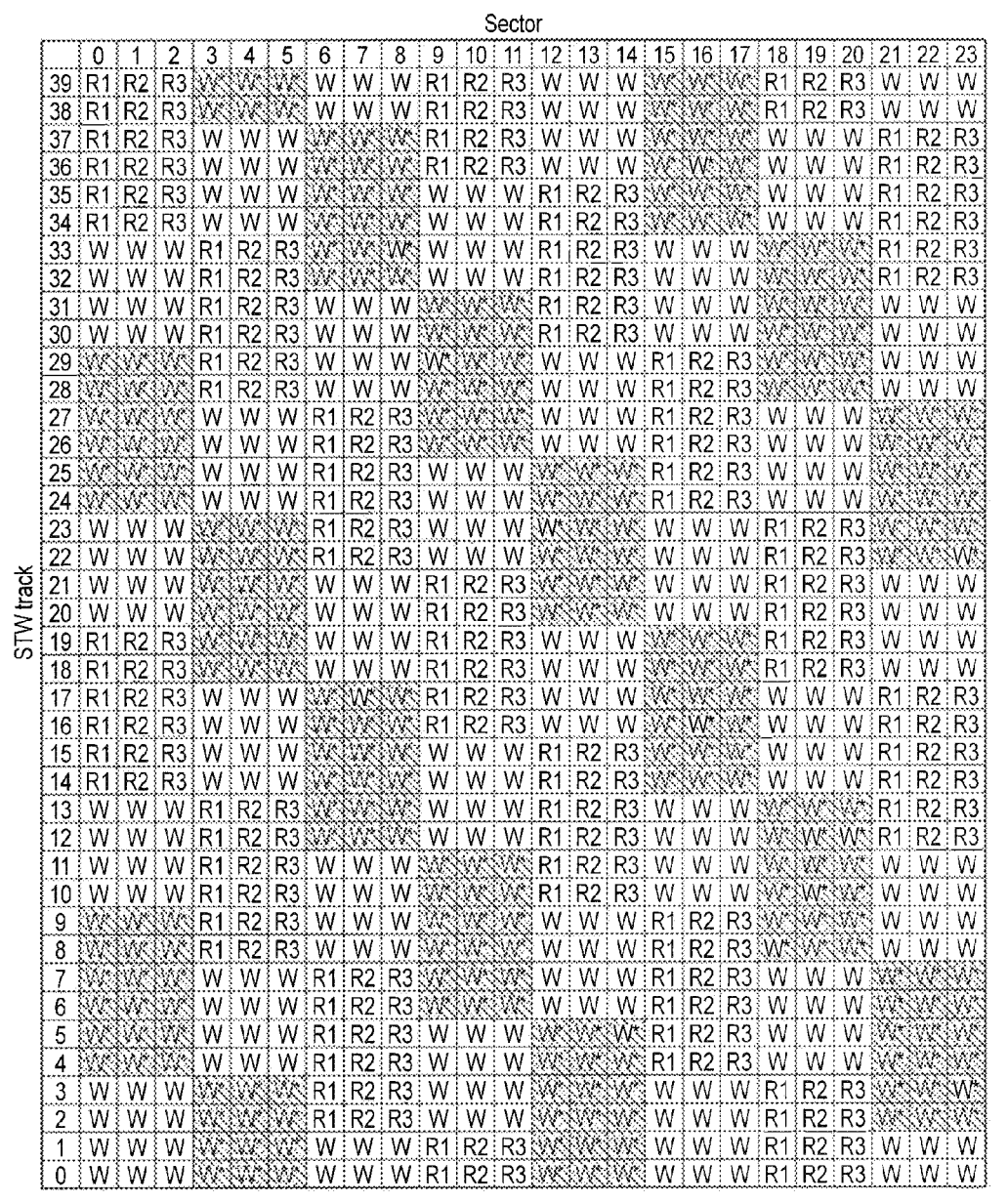

Referring now to FIGS. 11 to 13, a description will be given of a method of obtaining offset correction values during STW. In the embodiment, assume that the writer 12 and the reader 13 are positioned so that d will always assume a positive value or a negative value within a range of radius in which each head 5 is movable, as indicated by the thin curve in FIG. 5.

In the embodiment where u(x) is obtained during STW, it is desirable that the reader 13 should simultaneously read a servo pattern while the writer 12 writes a servo pattern. However, a general HDD head cannot simultaneously perform writing and reading. Even if this could be realized, demodulation of a position signal is difficult since a strong cross talk noise is superposed on a readback signal.

Referring to FIG. 11, a method of obtaining a R/W offset correction value will be described. FIG. 11 is a flowchart showing the method of obtaining the offset correction value during STW.

As shown in FIG. 11, upon starting STW, i_init and i_end are initialized in step S100 (i=i_init). i_init and i_end indicate one spline function block. Subsequently, in step S101, each head 5 is moved to an STW track i under the control of the MPU 10 and the SVC 6. At this time, in step S102, the writer 12 writes servo information to a servo sector j. The initial value of j is 0 (zero).

After writing the servo information, it is determined in step S103 whether writing (W) by all heads is to be performed, or reading (Rk) by a head-k is to be performed. The head-k indicates one of the heads 5, k being a head number. If it is determined that writing by all heads is to be performed, all heads write servo information to the respective data sectors j in step S104. After writing the servo information, processing in step S107, described later, is performed.

If it is determined that reading by the head-k is to be performed, the reader 13 of the head-k reads servo information from the data sector j in step S105. The data sector j indicates the leading portion of the data sector immediately after the servo sector j. In step S106, u(k,i,j) values as demodulation values are obtained based on the servo information read in step S105.

After the operations of steps S103 and S104 or of steps S103 to S106, it is determined in step S107 whether the data sector j is the last one. If it is determined that the data sector j is not the last one, the same processing is performed on the subsequent data sector (j+1). Namely, j is set to j+1 as shown in FIG. 11, whereby the program returns to step S102. In contrast, if it is determined that the data sector j is the last one, the program proceeds to step S108 where the u(k,i,j) values obtained in association with the respective heads-k are averaged to obtain u(k,i).

After obtaining u(k,i), it is determined in step S109 whether i=i_end. If i=i_end is not satisfied, the head-k is moved to the subsequent STW track i+1, whereby the above-described operations in steps S101 S108 are executed again. In contrast, if i=i_end is satisfied, coefficients for defining an interpolation approximation function associated with v(x) are calculated from a data sequence of u(k,i) in step S110. After calculating the coefficients, it is determined in step S111 whether the current STW track is the last one. If it is determined that the current STW track is not the last one, i_init and i_end are updated. Namely, i=i_int is updated, and the program returns to step S101, thereby iterating the operations of steps S101 to S110. If it is determined that the current STW track is the last one, STW is finished. Although in step S110 of the embodiment, coefficients for the interpolation approximation function are calculated during STW, they may be calculated after completing STW in order to further shorten the processing time of STW.

By the above-described method, u(x) during STW is measured.

FIG. 12 shows a general servo sector. To calculate the coefficients for defining the interpolation approximation function by the above-mentioned method, the servo pattern previously written is read by the reader 13 immediately after the writer 12 writes a servo pattern. To enable the reader 13 to read a written servo pattern during STW, it is sufficient if, for example, the servo pattern has been written in a position close to the leading end of the data sector (data field) placed immediately after the servo sector shown in FIG. 12. Namely, in the operations in steps S102 to 105 of FIG. 11, the writer 12 writes a servo pattern to a servo sector j, and then writes the same servo pattern to a part of a data sector as the area between the servo section 1 and the subsequent servo sector j+1. Alternatively, the reader 13 reads the servo pattern from the part of the data sector. Further, since the area of RRO is not usually used, a servo pattern may be written to RRO1 or RRO2. In the embodiment, the term "RRO" is named after "repeatable runout" as an example, but is not limited to the meaning.

Reading and writing (R/W) a servo pattern from and to a data sector will now be described. To write a servo pattern to a data sector and to read the servo pattern from the data sector, it is necessary to control the writing/reading timing of each head 5. For instance, in the bank write scheme, in the write operation in step S104, all heads 5 are controlled to simultaneously write servo patterns to respective data sectors, while in the read operation in step S105, one of the heads 5 is controlled to read a servo pattern, as is described above.

FIG. 13 shows an example of a R/W pattern as a servo pattern written to a data sector, according to the embodiment. The R/W pattern shown in FIG. 13 is an example of a pattern used in the case of self STW of a bank write scheme that employs four heads (head-0 to head-3). In the FIG. 13 case, the head-0 is used as the master head. In FIG. 13, the vertical axis indicates STW tracks in a STW forwarding direction, and the horizontal axis indicates sectors. In the self STW of the bank write scheme, all heads made valid in bank write operation simultaneously write data. For instance, in step S104, in the sectors denoted by "W" in FIG. 13, all heads (head-0 to head-3) write servo patterns to the respective servo sectors and part of the data sectors. Reading of the servo patterns from the part of the data sectors is performed only in the sectors indicated by "R1," "R2" and "R3." For example, in step S105, in the data sectors indicated by "R1," only the head-1 reads the servo pattern. In these data sectors, neither of the head-2 and head-3 reads the servo pattern. Similarly, in the data sectors indicated by "R2," only the head-2 reads the servo pattern, and in the data sectors indicated by "R3," only the head-3 reads the servo pattern. The sectors indicated by "W" and not hatched are tolerance areas for demodulation by the reader 13.

If the nominal R/W offset is di (d=di), one cycle is di×2. The "one cycle" indicates one cycle of the longitudinal R/W pattern of "W," "Rk," etc. in FIG. 13. The unit of the cycle is a STW track. For instance, when di=10, one cycle is 20 (STW tracks). Further, assuming that d is greater than s, n is the number of heads, s is the number of STW forwarding operations that are performed on one side in the radial direction and needed for demodulation, and include tolerance for STW variation, and Ns is the number of sectors, the number of positional errors obtained between the Ns sectors per each head is given by Ns/(n−1)/(2di)×(di−s). Since in FIG. 13, n=4, di=10, s=4 and Ns=25, the number of obtained positional errors is 2.4. As a result, within the range of 24 sectors shown in FIG. 13, 2 or 3 position signals are obtained. If 0<d<s, no position signals can be obtained. In this case, however, track deviations will involve no problem.

As described above, in the embodiment, u(x) can be obtained discretely during STW. In the track deviation associated with an offset error as an infralow frequency, the u(x) of each track can be determined by averaging if several u(x) values can be obtained while the head is running on each track in a revolution and v(x) can be obtained utilizing an interpolation approximation curve, such as a spline function, for the u(x) values of a plurality of tracks. By thus obtaining values necessary for R/W offset correction during STW, a highly accurate approximation interpolation function can be obtained. In this case, it is not necessary to calculate u(x) for each STW forwarding operation. Further, a magnetic disk device, which employs a method of calculating correction values for R/W offset errors according to the embodiment, can reliably correct R/W offset errors due to track deviations caused by infralow frequency. For instance, since a track deviation due to infralow frequency appears conspicuously during STW of the bank write scheme, R/W offset errors can be reliably corrected in the magnetic disk device 1 of the bank write scheme. Accordingly, deterioration of performance due to offset errors during data reading can be avoided.

Although in the embodiment, data on v(x)–x can be obtained during STW, it can be obtained without increasing the adjustment time in the manufacturing process.

In the embodiment, for example, the aforementioned approximation interpolation function, such as the spline function, is stored in the nonvolatile memory 11 or a magnetic disk, and calculation and processing of the correction values are performed by, for example, the MPU 10. The calculated offset correction values may be added to the information held in the RRO1 and RRO2 shown in FIG. 12, and the resultant information be used as offset correction information. Further, although the v(x) calculation unit, the u(x) calculation unit, the calculation unit for calculating offset correction values during STW, etc., are incorporated in the magnetic disk device 1 as the firmware used in the manufacturing process, these function units may also be incorporated in the magnetic disk device 1 in the finished product stage.

Second Embodiment

In the above-described first embodiment, the method of obtaining R/W offset correction values, in which d as the R/W offset is always positive or always negative has been described. A description will now be given of a method of obtaining R/W offset correction values, which is employed when d is not always positive or negative.

The STW in the magnetic disk device 1 of the second embodiment is, for example, a self STW of the bank write scheme. Further, in the second embodiment, neither of the writer 12 and the reader 13 is relatively arranged such that the R/W offset is always positive or negative. The other structure than this is substantially the same as that of the magnetic disk device 1 of the first embodiment. Therefore, the other structure will not be described in detail.

In the second embodiment, the R/W pattern of a servo pattern written to a data sector differs from that of the first embodiment. The control of the R/W pattern of the servo pattern written to the data sector will be described.

In the second embodiment, each of a plurality of heads 5 other than a master head is positioned after all STW operations are completed. For instance, if one of the heads 5 is positioned in a track x, the writer 12 of the head positioned in the track x is positioned in $f(x)+d$. In this position, the writer 12 writes the servo pattern of the track x. In this case, the reader 13 of the head is positioned in $f(x)$. In this position, the reader 13 demodulates the servo pattern of part of the data sectors. The absolute position of the reader 13 at this time is expressed as $f(u(x))+d=f(x)$. $f(u(x))+d=f(x)$ can be changed to $f(u(x))=f(x)-d$.

As described in the above principle of R/W offset correction, if the inverse function of $u(x)$ is $x=\text{inv\_u}(u)$, $f(u(x))$ can be expressed as $f(u(x))-f(\text{inv\_u}(u))-d$. Since u, v and x belong to the same dimension, u in $f(u(x))-f(\text{inv\_u}(u))-d$ is replaced with x. By this replacement, $f(x)=f(\text{inv\_u}(x))-d$ is established. By comparing $f(x)=f(\text{inv\_u}(x))-d$ with $f(v)=f(x)+d$, $v(x)=\text{inv\_u}(x)$ can be derived.

Thus, if the demodulated value $u(x)$ of the reader is calculated, $\text{inv\_u}(x)$ can be derived. From $v(x)=\text{inv\_u}(x)$, an offset correction value $v(x)\_x$ can be obtained.

If d is positive, the servo pattern written to a data sector by moving the defined coordinate x of the servo pattern can be demodulated. However, if d is negative, to demodulate the servo pattern, it is necessary to move x in the negative direction to thereby write the servo pattern to the data sector.

Further, if d changes from positive to negative or from negative to positive during the time when the head 5 moves from ID to OD, writing from both sides is necessary. Since at this time, correction of a R/W offset due to a track deviation does not have to be considered near d=0, no measurement is needed in the vicinity of d=0. These control operations are appropriately performed on each of the heads 5.

Figure 14:
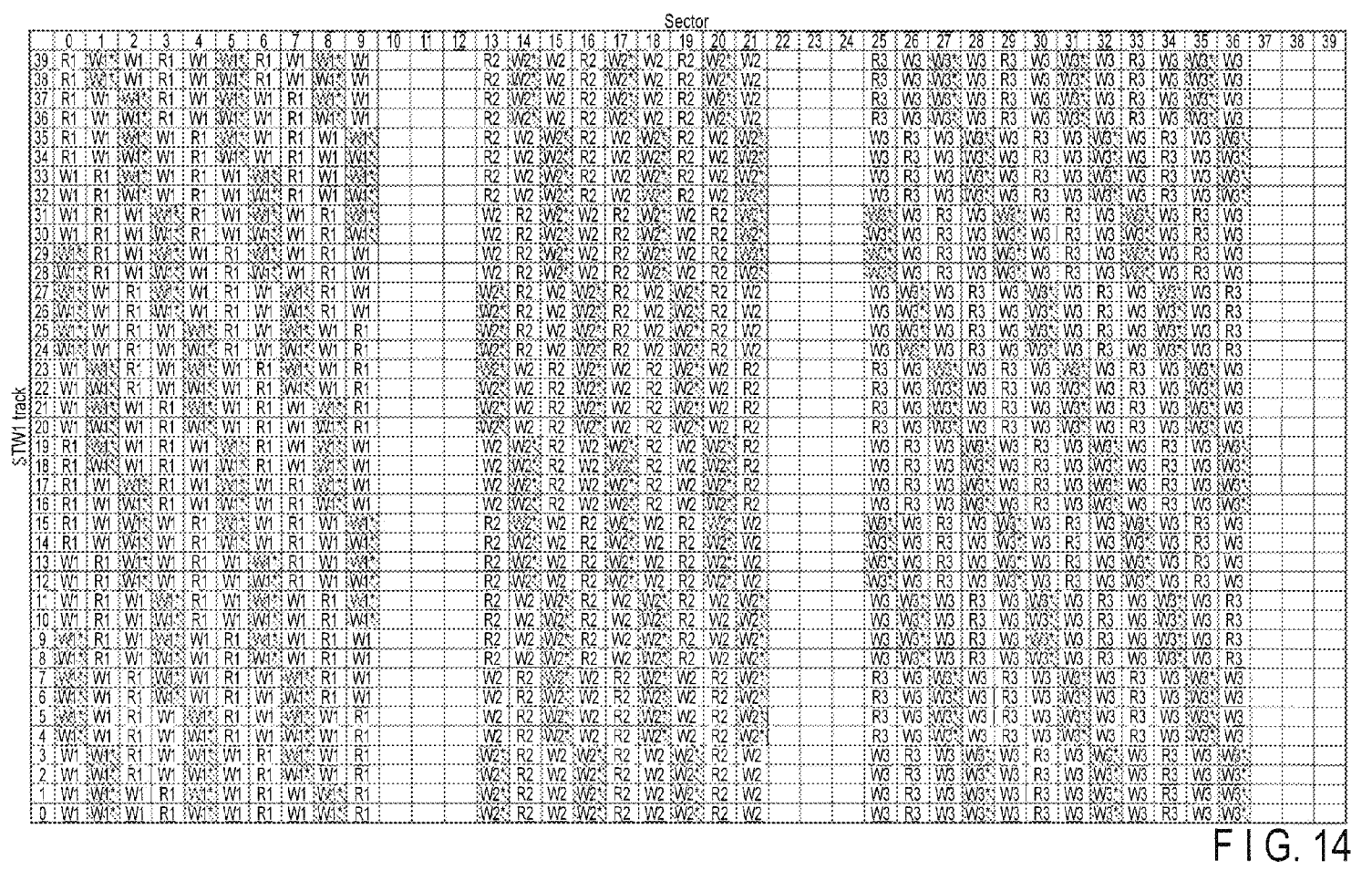

Referring then to FIG. 14, an example of the second embodiment will be described. FIG. 14 shows an example of a R/W pattern as a servo pattern written to a data sector, according to the second embodiment. In FIG. 14, the horizontal axis indicates sectors, and the vertical axis indicates STW tracks corresponding to STW forwarding operations. In the FIG. 14 case, the total number of the heads is four, and the head-0 is the master head. Further, FIG. 14 shows the case where in the head-1, d=+10, in the head-2, d=+12, and in the head-3, d=+8.

In the FIG. 14 case, the heads 5 comprise heads having close d values. Therefore, R/W of servo patterns corresponding to one track can be performed by classifying the heads into groups of closer d values, and switching the heads in each group. However, since in the second embodiment, the heads 5 are positioned unlike the first embodiment, a position settling operation is needed whenever head switching is performed. Accordingly, to perform continuous sampling for each head, such a measurement procedure as shown in FIG. 14 is determined. In FIG. 14, reference symbols W1, W2 and W3 denote that the head-1, the head-2 and the head-3 perform their respective writing. Similarly, in FIG. 14, reference symbols R1, R2 and R3 denote that the head-1, the head-2 and the head-3 perform their respective reading. Further, in FIG. 14, W1, W2 and W3, which are not hatched, denote writing sectors as a tolerance for demodulation. FIG. 14 shows the case where each head (the head-1, the head-2 and the head-3) demodulates a position signal at three places to obtain $u(x)$. In accordance with the offset amount between the writer 12 and the reader 13, the R/W pattern is changed.

As described above, in the second embodiment, even when d is not always positive or negative, R/W offset correction values can be obtained.

In the second embodiment, for example, the aforementioned approximation interpolation function, such as the spline function, is stored in the nonvolatile memory 11 or a magnetic disk, and calculation and processing of the correction values are performed by, for example, the MPU 10. The calculated offset correction values may be added to the information held in the RRO1 and RRO2 shown in FIG. 12, and the resultant information be used as offset correction information. Further, although the $v(x)$ calculation unit, the $u(x)$ calculation unit, the calculation unit for calculating offset correction values during STW, etc., are incorporated in the magnetic disk device 1 as the firmware used in the manufacturing process, these function units may also be incorporated in the magnetic disk device 1 in the finished product stage Third Embodiment The aforementioned embodiments are directed to the methods of obtaining offset correction values by obtaining $u(x)$. A third embodiment is directed to a method of estimating a track deviation.

The magnetic disk device of the third embodiment has substantially the same structure as the magnetic disk device 1 of the second embodiment. Therefore, no detailed description will be given of the structure.

When the fluctuation cycle of the (servo) track deviation is short, $e(x)=f(x)-x$ can be estimated by observing a response from a servo system. $e(x)$ indicates a track deviation. From this, $v(x)=\text{inv\_f}(f(x)+d)$ used for reading data can be estimated. The servo system is a general one to anyone skilled in the art, and is used to determine an appropriate current for driving the VCM incorporated in the actuator 4.

A method of estimating $e(x)$ will hereinafter be described. For the description, the following definitions are made:

n is the number of servo sectors.

tar, rpe and dst are vectors each having an element count of n.

tar[j], rpe[j] and dst[j] (j=0, 1, 2, ..., n−1) are set as the values of the $j^{th}$ elements of the vectors tar, rpe and dst, respectively.

e_sum[i], count[i] and e[i] are set as values in a track i.

Sensitivity function sf is a complex vector having n/2 elements. In this sensitivity function, since the phase is defined in accordance with a general definition, reversed phase is used for calculation.

FIG. 15 is a flowchart showing an estimation procedure of a track deviation. FIG. 16 shows an example of a loop transfer function (open-loop transfer function). FIG. 17 shows an example of the sensitivity function. FIGS. 16 and 17 are directed to an example of a magnetic disk with a rotational speed of 5400 rpm and n of 190. In the upper and lower portions of FIG. 16, the horizontal axis indicates the frequency. In the upper portion of FIG. 16, the vertical axis indicates the gain of the open loop. In the lower portion of FIG. 16, the vertical axis indicates the phase of the open loop. In the upper and lower portions of FIG. 17, the horizontal axis indicates the frequency. In the upper portion of FIG. 17, the vertical axis indicates the gain of the sensitivity function. In the lower portion of FIG. 17, the vertical axis indicates the phase of the sensitivity function.

Referring first to FIG. 15, a description will be given of an estimation procedure of a track deviation employed in the third embodiment. Firstly, in step S200, the servo system obtains the sensitivity function of a track following servo system. The function actually obtained by the servo system is, for example, an open loop transfer function. By transforming the obtained open loop transfer function, such a sensitivity function as shown in FIG. 17 can be obtained.

The data necessary for track deviation estimation are frequency components that are integral multiples of the fundamental frequency associated with rotation. Accordingly, an operation, such as interpolation, is performed on the frequency component when necessary. Although the sensitivity function is a complex data sequence (vector) with elements half the servo sectors, zero-order and higher-order components may be ignored.

Subsequently, sine-wave data corresponding to a target offset in a servo sector is generated and stored in the vector tar. In step S201, each element is indicated by $tar[j]=a\times \sin(2\pi j/n)$. The amplitude a is adjusted to an appropriate value in accordance with the number n of the servo sectors.

After that, in step S202, e_sum and count are initialized to zero, and in step S203, the head is moved to the $i^{th}$ track.

The processing in step S204 will now be described. The following target position in a sector j is set to i+tar[j], whereby following control is performed. FIG. 18 shows examples of following target paths and head paths expressed by the track coordinate. In FIG. 18, the broken lines indicate the following target paths, and the solid lines indicate the head paths. Further, in the case of FIG. 18, the track deviation is a synthesized wave of a wave with a cycle of 17.5 tracks and an amplitude of 1.2 tracks, and a wave with a cycle of 11.25 tracks and an amplitude of 0.3 tracks, and has a track coordinate of n=190 and a=10. In the track coordinate, the following target paths are expressed by sine waves. However, although in terms of the track coordinate, the following target paths are expressed by sine waves, the head paths expressed by the track coordinates are deviated from following target paths, since the tracks expressed by the physical coordinates contain track deviations. Even if there is no track deviation, slight deviation will occur inevitably because a response to a target path of a sine wave shape is retarded (disturbance). This deviation, however, is so small as cannot be recognized in the scale of FIG. 18. When the PES is measured in this case, the non-synchronous component of the signal serves as noise and adversely affects the signal. Therefore, it is desirable to measure PES values corresponding to several rotations and to average the values and obtain the averaged value as a repeatable position error (RPE). The measured PES (RPE) is stored in rpe[j] vector.

If there is no e(x) of a long cycle, rpe[j] contains only "a sine wave determined from the 1st order component of the sensitivity function with respect to the amplitude a," which is caused by a 1st order sine wave target path, and a track fluctuation of a short cycle. In contrast, if such e(x) exists, rpe[j] contains a component due to the fact that an actual target position is deviated when the head traverses a track.

Figure 19:
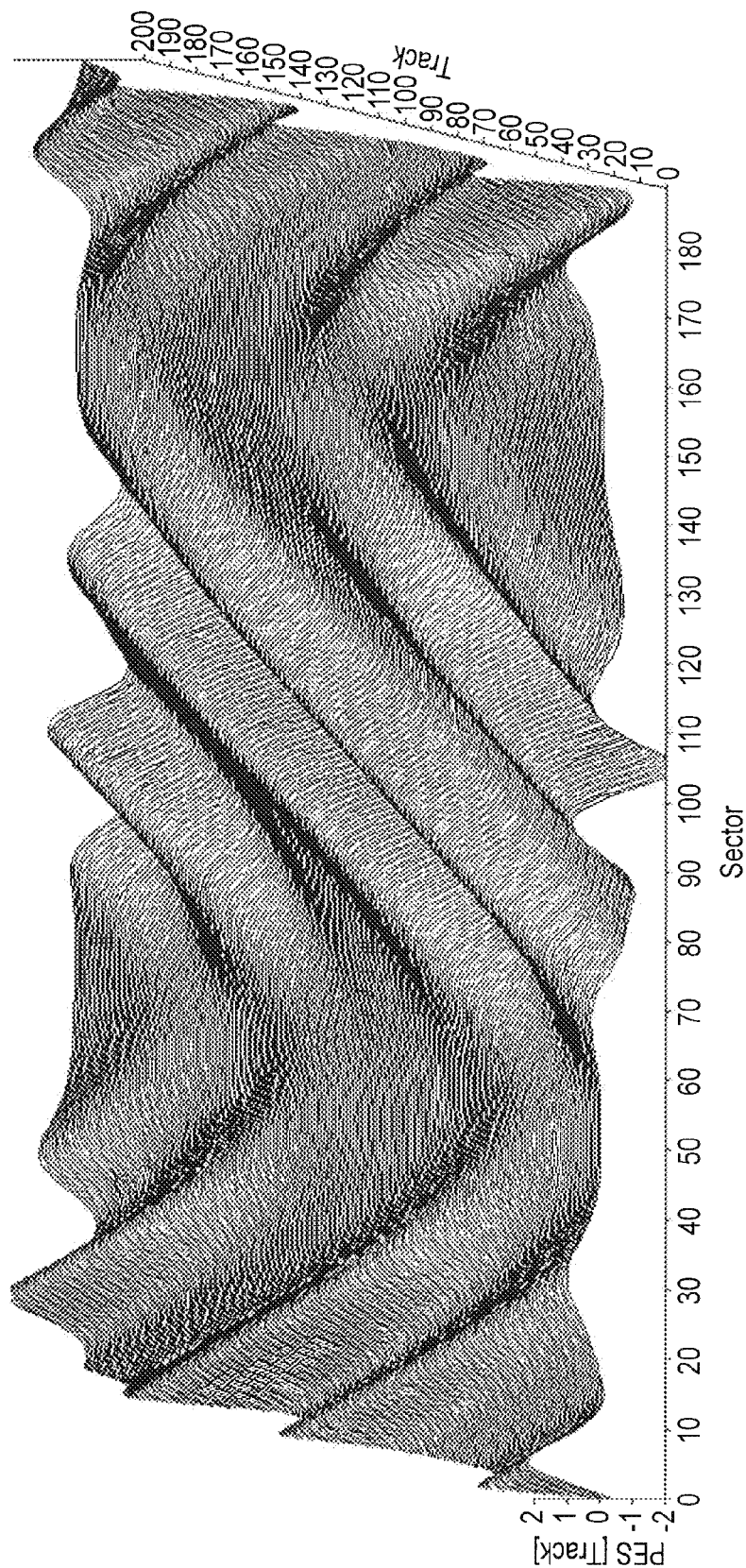
FIG. 19 shows waterfall plots of rpe values assumed when track deviation e(x) values contain no track fluctuations of short cycles, and contain only track fluctuations of long cycles, i.e., track fluctuations formed of a wave with a cycle of 70 tracks and an amplitude of 1.2 tracks, and a wave of with a cycle of 45 tracks and an amplitude of 0.3 tracks.

FIG. 19 shows the three-dimensional plots (waterfall plots) of rpe values obtained when e(x) contains no short-cycle track fluctuations, and contains only long-cycle components with a cycle of 70 tracks and an amplitude of 1.2 tracks, and with a cycle of 45 tracks and an amplitude of 0.3 tracks. FIG. 20 shows rpe values of the track-0, track-25 and track-50. FIG. 21 shows PES components due to e(x). FIG. 19 shows rpe values of the track-0 to track-200 obtained under the conditions of n=190 and a=100. FIG. 20 shows the rpe values of track-0, track-25 and track-50 included in the rpe values of the track-0 to track-200. The waveforms shown in FIG. 21 are obtained by eliminating the components due to the sine-wave target path from the waveforms shown in FIG. 20.

Figure 23:
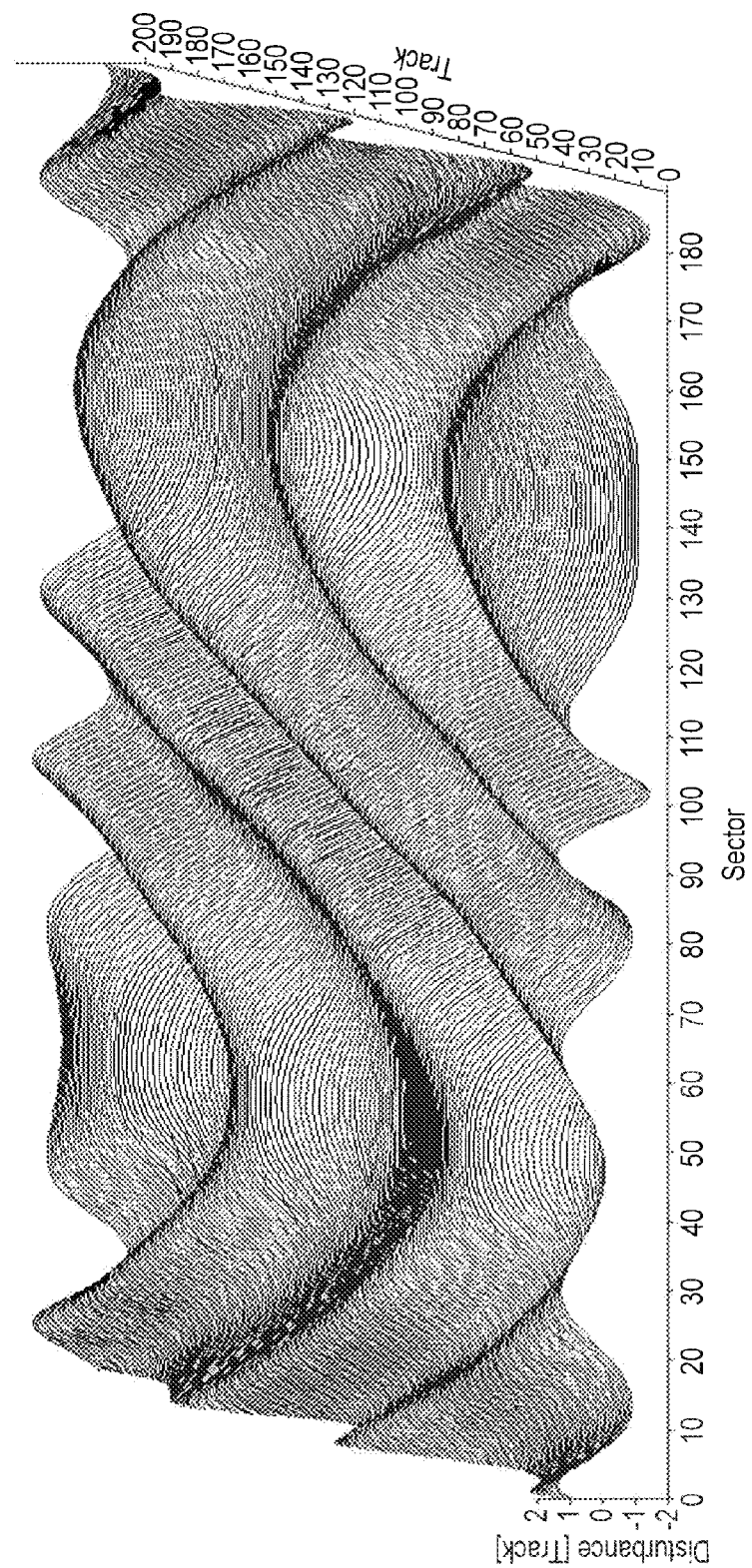
FIG. 23 shows waterfall plots associated with the tracks (a track-0 to a track-200) shown in FIG. 22.
Figure 24:
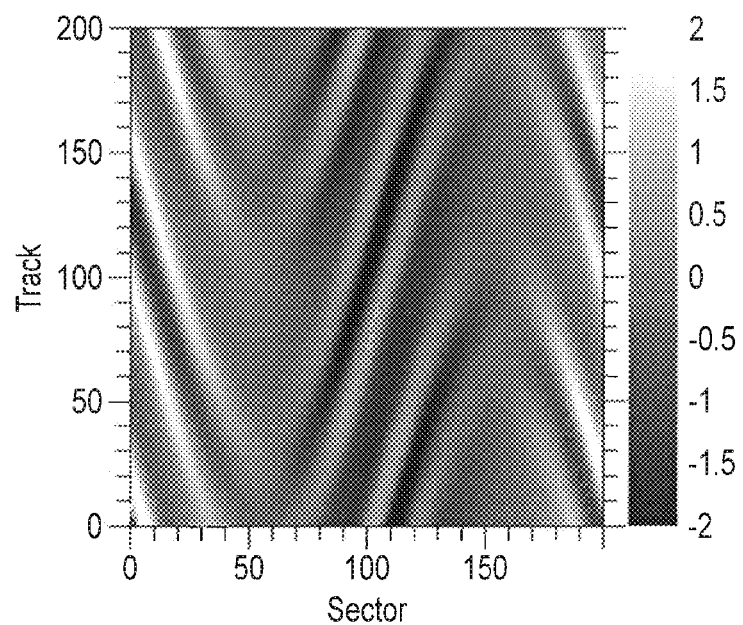
FIG. 24 is a contrasting density plot corresponding to waterfall plots of FIG. 19.
Figure 25:
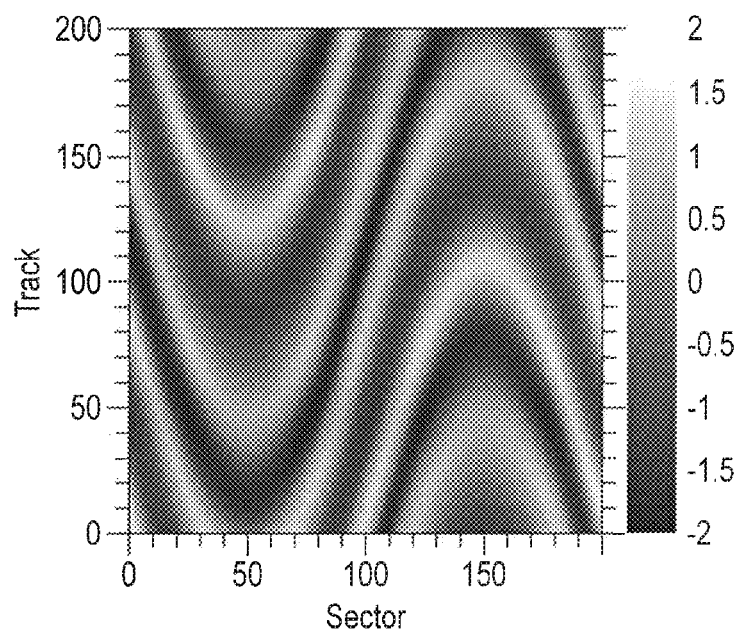
FIG. 25 is a contrasting density plot corresponding to waterfall plots of FIG. 23.

The processing in step S205 will be described. FIG. 22 shows the result obtained by filtering the PES values of FIG. 20 using an inverse sensitivity function and eliminating therefrom the sine-wave target path. FIG. 23 shows the waterfall plots of the track-0 to the track-200 shown in FIG. 22. The component corresponding to disturbance is obtained by performing discrete Fourier transform (DFT) on the rpe[j] measured in a track i, then performing complex number division on the resultant value using the sensitivity function sf, and performing inverse DFT on the division result. This is the same result as that obtained by performing convolution integral using a filter with the inverted characteristics of the sensitivity function. The waveforms and waterfall plots shown in FIGS. 22 and 23 are results of eliminating the component of tar from the component corresponding to disturbance. The same result as that shown in FIG. 22 can be obtained even by subjecting the waveforms of FIG. 21 to inverse sensitivity function filtering. FIG. 24 is a contrasting density plot corresponding to the waterfall plots of FIG. 19. FIG. 25 is a contrasting density plot corresponding to the waterfall plots of FIG. 23.

FIG. 26 is a graph showing the result obtained by superposing the errors from target points, which have occurred when the head was attempted to be offset to the target points. When the data obtained by shifting the horizontal axis by tar[j] for each sector is plotted, superimposed, a smooth line with a certain width appears as shown in FIG. 26. As shown in FIG. 26, the e(x) values indicated by the white line are positioned at substantially the widthwise center of the black thick line.

In the subsequent step S206, dst[j] is added to an element e_sum[i+tar[j]] of a track number (i+tar[j]), which is obtained by shifting each track by tar[j] on a sector basis. Since tar[j] in (i+tar[j]) is not always an integer, it is desirable that the fractional part be held in the dst vector of a track i−1 immediately before the current track, and be interpolated. In the subsequent step S207, it is determined whether measurement should be finished or continued. If measurement is determined to be continued, the program returns to step S203 and the above-mentioned processing is repeated while the head is being moved over the tracks in order. If it is determined that measurement should be finished, the e_sum values are averaged for each element. As a result, a value close to e(x) can be estimated.

FIG. 27 shows a comparison result between e(x) values and estimated values thereof. In FIG. 27, the broken line indicates the line formed by superimposing plots of FIG. 26, and the solid line indicates the white line of FIG. 26. Namely, in FIG. 27, the broken line indicates estimated values, and the solid line indicates e(x) values. As shown in FIG. 27, the plotted e(x) values are substantially superimposed on the estimated values.

In the points close to the maximum or minimum of the sine wave, the head does not so often traverse tracks, and hence the influence of e(x) on the PES is not conspicuous. Therefore, addition to e_sum may be limited to, for example, |tar[j]|<0.5×a. In the flowchart, rpe, dst and e_sum values can be stored in the same storage area as e. Further, if there is an area four times the amplitude a, the e_sum values can be calculated while the head is being shifted. In addition, an increment to i is not always limited to 1.

Track fluctuation of a short cycle is mainly an asynchronous vibration during STW, track fluctuations of short cycles are almost eliminated when the above-mentioned averaging is performed. Also, the influence of a synchronous component is suppressed by averaging performed in each sector after tar[j] shifting.

Furthermore, even in e(x) of a cycle three times the above-mentioned one, values close to e(x) are estimated. However, since the waveform obtained by eliminating components due to tar from the observed PES (RPE) is substantially zero, it is difficult to estimate e(x) of a long cycle from this data if noise is contained therein.

As described above, if a data sequence of e(x) can be obtained, it can be converted into a data sequence of f(x)=e(x)+x. Accordingly, this data sequence can be used for offset correction by obtaining, by interpolation, v that satisfies f(v)=f(x)+d, and approximating "the relationship between x and v(x)," "the relationship between x and v(x)−x," or the relationship between x and v(x)−x−d," using, for example, least squares spline approximation.

FIG. 28 is a flowchart of a procedure of calculating correction amount interpolated values vi from the data sequence of e(x) obtained in FIG. 15, and calculating the coefficients of the spline function. FIG. 28 is directed to an example case where d>0 and the target zone is x[i_init] to x[i_end]. "d" indicates such "a geometric R/W offset" as shown in FIG. 5, and its value in a radial position can be obtained by interpolation, based on the offset values measured at a plurality of points in the entire zone and the geometric relationship therebetween.

Referring to FIG. 28, a description will be given of a procedure of calculating correction amount interpolated values vi from a data sequence of e(x), and calculating the coefficients of the spline function. In FIG. 28, it is supposed that the track coordinate in a zone of a cubic spline curve ranges from x[i_init] to x[i_end]. It is also supposed that in this zone, data on e(x[i]) values corresponding to (i_end−i_init+1) tracks has already been obtained by the procedure of FIG. 15. In the following, e(x[i]) will be referred to e[i] for convenience sake. In step S300, the initial number i_init in the zone is set in a counter i, and in step S302, the absolute coordinate y including an error in a track x[i] is calculated. "y" indicates the sum of geometric RWO(d) and f(x)=e(x)+x as the absolute coordinate of the track. In steps S303 and S304, j, in which f(x)=e(x)+x exceeds y, is searched for, and in step S305, vi[i] is obtained by linear interpolation from the (j−1)$^{th}$ and j$^{th}$ data. This processing is repeated until i reaches i_end, and the coefficients of the least squares spline function applied to the zone are calculated from the obtained data sequence of vi[i_init] to vi[i_end].

Figure 29:
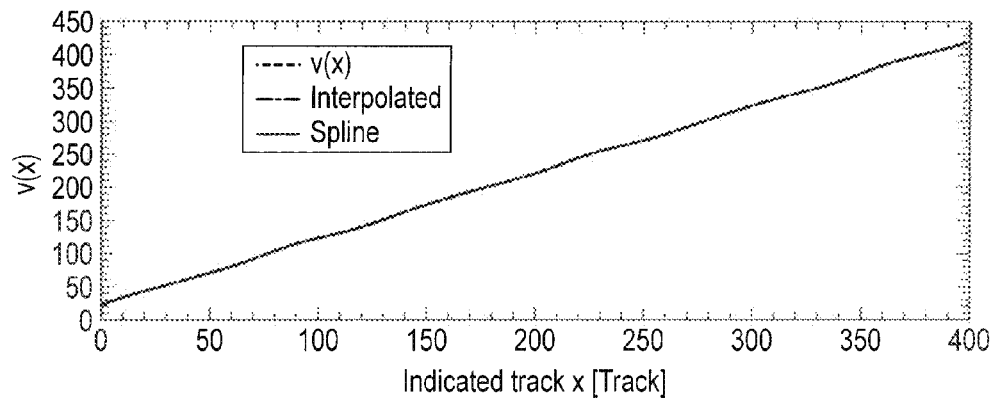
FIG. 29 is a graph showing an example of a spline approximation function (10 track data/block) of v(x) calculated from the data of the track deviation e(x) shown in FIG. 27.
Figure 30:
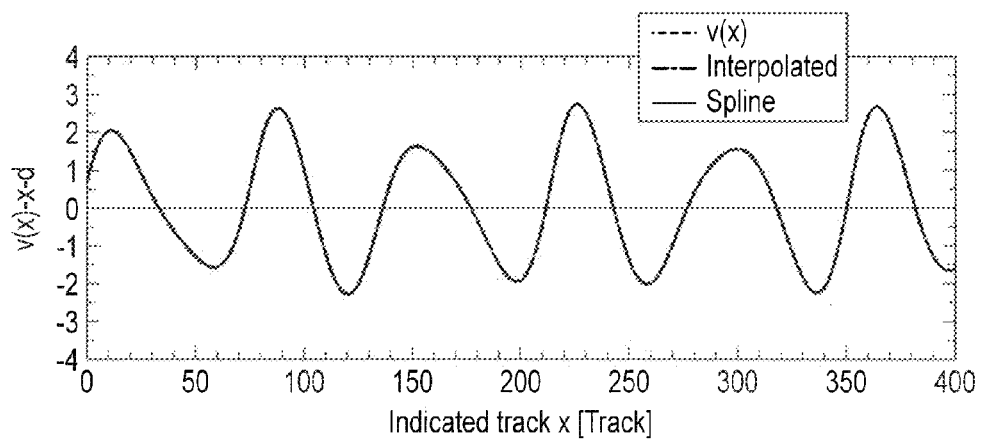
FIG. 30 is a graph showing an example of a spline function indicating correction amounts v(x)−x−d obtained from the e(x) values of FIG. 27.
Figure 31:
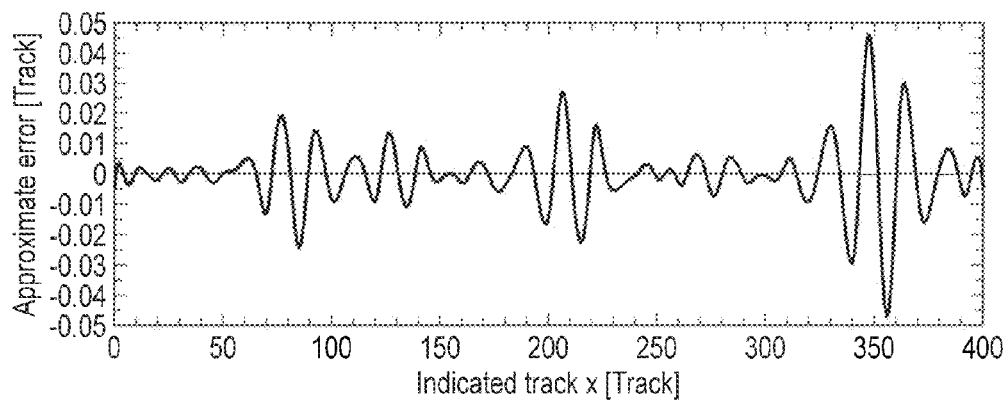
FIG. 31 is a graph showing examples of approximate errors to v(x) obtained by spline approximation.

Referring then to FIGS. 29 to 31, a description will be given of examples associated with estimation of track deviations according to the embodiment, and with correction amounts obtained from the estimated values.

FIG. 29 is a graph showing an example of a v(x) spline approximation function (10 track data/block) calculated from the data on the track deviation shown in FIG. 27. In FIG. 29, v(x) values obtained from f(v)=f(x)+d by the Newton's method, v(x) values obtained by interpolation, and v(x) values obtained from the coefficients calculated by the least squares cubic spline approximation, are plotted, superimposed. In FIG. 29, the lines indicating those values are substantially superimposed on each other.

FIG. 30 is a graph showing an example of a spline function indicating correction amounts v(x)−x−d obtained from the track deviation of FIG. 27. In FIG. 30, the correction amounts v(x)−x−d, v(x) values obtained by interpolation, and v(x) values obtained from the coefficients calculated by the least squares cubic spline approximation, are plotted, superimposed. In FIG. 30, the lines indicating those values are substantially superimposed on each other.

FIG. 31 is a graph showing examples of approximate errors in v(x) obtained by spline approximation. In FIG. 31, the horizontal axis indicates tracks, and the vertical axis indicates approximate errors. In the example case of FIG. 31, the approximate errors in v(x) obtained by spline approximation are less than 0.05.

By virtue of the above-described methods, when the fluctuation cycle of track deviation is short, correction function parameters can be obtained from a position error signal without additional writing of a position signal to data sectors.

R/W offset errors as correction objects in the embodiments are not used for data writing. Since in the embodiments, writing of data to a data area is not performed to obtain correction values, correction data can also be generated after product shipping. Namely, after data writing, an operation, employed in the embodiments, of obtaining a correction value based on estimated track deviation can be performed only in the area in which a read error has occurred.

In the embodiments, such an approximate interpolation function as the aforementioned spline function is held in the nonvolatile memory 11, a magnetic disk, or the like, and correction value calculation and processing are performed in, for example, the MPU 10. Offset correction information may be formed by adding the calculated offset correction value to the information stored in the RRO1 or RRO2 shown in FIG. 12. Further, an estimation unit for estimating e(x) may be incorporated in the magnetic disk device 1.

Although in the above-described embodiments, an interpolation approximation function is used as the spline function, the former is not limited to the latter. The interpolation function in the embodiments may be Lagrangian function, for example.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiment described herein may be made without departing from the spirit of the invention. The accompanying claims and their equivalents are intended to cover such forms or modifications as would fall within the scope and spirit of the inventions.

What is claimed is:

1. A method of correcting a read/write offset, for a magnetic disk device including a head and a disk with a recording surface, the head including a reader configured to perform data reading, and a writer configured to write data, the method comprising:
   reconstructing position data read by the reader, using a spline function;
   correcting a read/write offset due to a distance between the writer and the reader, using the reconstructed position data;
   estimating a track deviation from a position error signal;
   acquiring coefficients which define the spline function used to obtain a correction value of a read/write offset in each of tracks as position error measurement objects, using the estimated track deviation;
   providing each of servo sectors in each track with a target offset value which varies according to a sine wave path;
   measuring a position error signal obtained when the head is controlled to follow a target path that is obtained by adding the target offset value to a value assumed in each of widthwise central points of each track;
   processing the position error signal corresponding to each track, using a filter having inverse characteristics of a sensitivity function for a following control system;
   subtracting the target offset value in each servo sector;

adding a value obtained by subtracting the target offset value in each servo sector, to a sum in each track of a track number obtained by adding the target offset value in each sector; and acquiring an estimated value by dividing the sum by a number of times of addition performed in each track.

2. The method of claim 1, further comprising:

writing, using the writer, a servo pattern for position demodulation to a servo sector on the recording surface, and to a data sector adjacent thereto on the recording surface;

reading, using the reader, the servo pattern for position demodulation written to the data sector; and obtaining coefficients which define the spline function, using the position data acquired by reading the servo pattern for position demodulation from the data sector.

3. The method of claim 2, further comprising:

writing, using the writer, the servo pattern for position demodulation, and reading, using the reader, the written servo pattern for position demodulation during a self servo track write of a bank-write scheme; and acquiring, during the self servo track write or after the self servo track write, the coefficients which define the spline function, using the position data obtained by reading by the reader.

4. The method of claim 2, wherein the acquiring the coefficients comprises acquiring the coefficients of the spline function using least squares cubic spline approximation.

5. A magnetic disk device comprising:

a head including a reader configured to read data, and a writer configured to write data;

a disk including a recording surface opposing the head;

an actuator including a distal end with the head provided thereon; and a controller configured to control driving the actuator, wherein the controller:

reconstructs position data read by the reader, using a spline function;

calculates a correction value for correcting a read/write offset caused by a distance between the writer and the reader, using the reconstructed position data;

controls driving the actuator based on the correction value;

estimates a track deviation based on a position error signal output from the head, and calculates coefficients which define the spline function, using the estimated track deviation, the spline function being used to calculate a correction value for a read/write offset in each of tracks as position error measurement targets;

provides each of servo sectors in each track with a target offset value which varies to exhibit a sine wave path;

measures a position error signal obtained when the head is controlled to follow a target path that is obtained by adding the target offset value to a value assumed in each of widthwise central points of each track;

processes the position error signal corresponding to each track, using a filter having inverse characteristics of a sensitivity function for a following control system;

subtracts the target offset value in each servo sector;

adds a value obtained by subtracting the target offset value in each servo sector, to a sum in each track of a track number obtained by adding the target offset value in each sector; and acquires an estimated value by dividing the sum by a number of times of addition performed in each track.

6. The magnetic disk device of claim 5, wherein the writer writes a servo pattern for position demodulation to a servo sector on the recording surface, and to a data sector on the recording surface adjacent to the servo sector;

the reader reads the servo pattern for position demodulation from the data sector; and the controller calculates coefficients which define the spline function, using the position data obtained by reading the servo pattern for position demodulation from the data sector.

7. The magnetic disk device of claim 6, wherein the magnetic disk device is configured to execute a self servo track write of a bank write scheme;

the writer writes the servo pattern for position demodulation during the self servo track write;

the reader read the servo pattern for position demodulation during the self servo track write; and the controller calculates, during the self servo track write or after the self servo track write, the coefficients which define the spline function, using the position data read by the reader.

8. The magnetic disk device of claim 6, wherein the controller calculates the coefficients of the spline function using least squares cubic spline approximation.

* * * * *